(12) United States Patent
Suizu et al.

(10) Patent No.: US 6,322,101 B1
(45) Date of Patent: *Nov. 27, 2001

(54) INSTRUMENT PANEL INTEGRALLY EQUIPPED WITH AIR BAG DOOR PORTION

(75) Inventors: Yasushi Suizu; Toshihiko Nakamura; Kazuo Kobayashi; Takuya Higashiura; Atsushi Sugiura, all of Toyota (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,348

(22) Filed: Oct. 1, 1998

(30) Foreign Application Priority Data

Oct. 9, 1997 (JP) .................................................. 9-277350
Jul. 16, 1998 (JP) .................................................. 10-201812

(51) Int. Cl.⁷ .................................................. B60R 21/16
(52) U.S. Cl. ...................................... 280/732; 280/728.3
(58) Field of Search ............................... 280/728.3, 732, 280/743.1, 728.1

(56) References Cited

U.S. PATENT DOCUMENTS

| 5,390,950 | * | 2/1995 | Barnes et al. | .................... | 280/732 X |
|---|---|---|---|---|---|
| 5,478,107 | | 12/1995 | Yamagishi et al. | .............. | 280/732 X |
| 5,533,748 | | 7/1996 | Wirt et al. | ......................... | 280/732 X |
| 5,564,733 | * | 10/1996 | Duenas et al. | .................... | 280/732 X |
| 5,630,613 | | 5/1997 | Leonard et al. | ................. | 280/732 X |
| 5,681,051 | * | 10/1997 | Phillion | ............................ | 280/732 X |
| 5,775,727 | * | 7/1998 | Sun et al. | ......................... | 280/732 X |
| 5,992,876 | * | 11/1999 | Gray | ................................. | 280/732 X |
| 5,997,030 | * | 12/1999 | Hannert et al. | .................. | 280/732 X |

FOREIGN PATENT DOCUMENTS

| 33 15 535 A1 | 3/1984 | (DE) . |
|---|---|---|
| U-5-58517 | 8/1993 | (JP) . |
| A-5-229367 | 9/1993 | (JP) . |

\* cited by examiner

*Primary Examiner*—J. J. Swann
*Assistant Examiner*—F. Zeender
(74) *Attorney, Agent, or Firm*—Oliff & Berridge, PLC

(57) ABSTRACT

An instrument panel of a division type, which has distinctly divided portions, reduces restrictions on designing freedom resulting from a break line and a parting line of an air bag door portion and prevents the overall quality of the outward appearance from deteriorating. The instrument panel is of a type that is divided into upper and lower panels, and the lower panel is divided into a passenger-side lower panel and a driver-side lower panel. The parting line of the instrument panel coincides with a cleavage line defined by an upper air bag door portion and a lower air bag door portion. In a lower door insert of the lower air bag door portion, a free end thereof is set wider than a fixed end thereof. The passenger-side lower panel including the lower air bag door portion is entirely covered with a single skin.

18 Claims, 25 Drawing Sheets

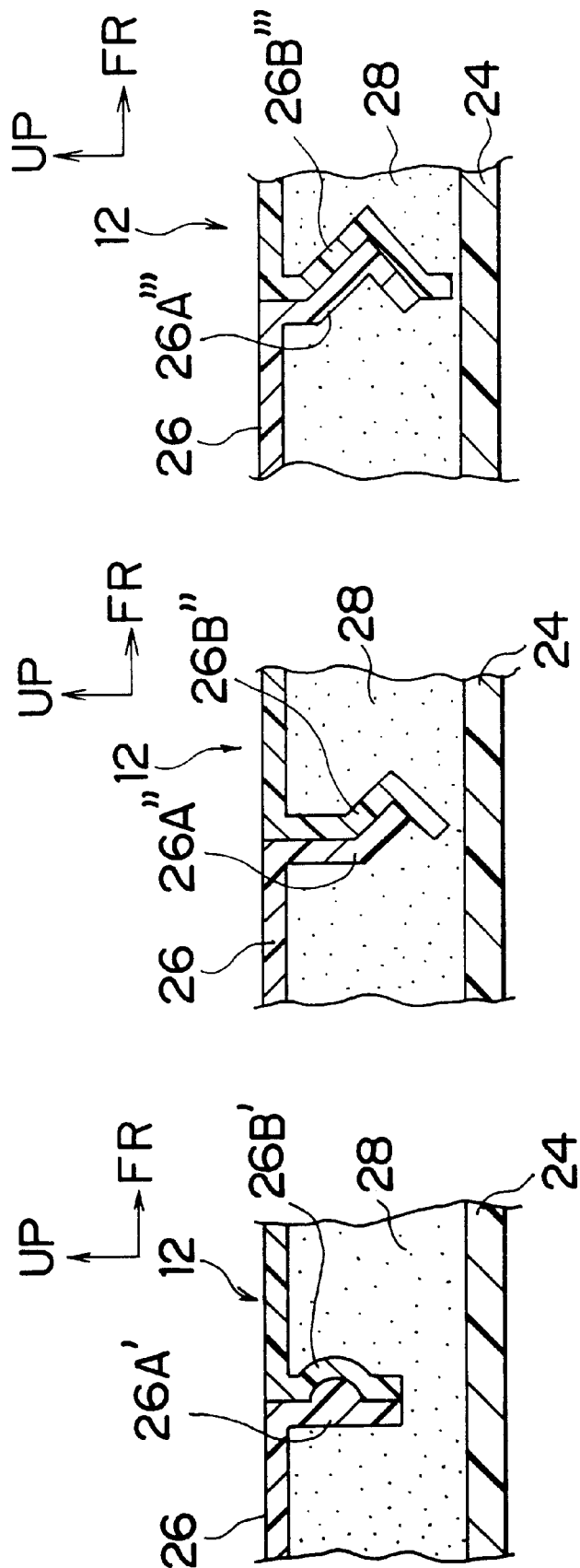

FIG. 20
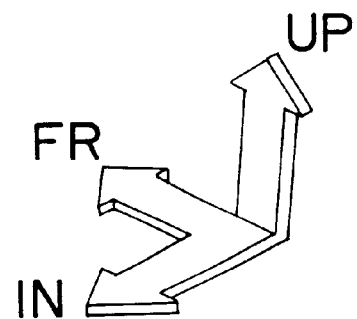
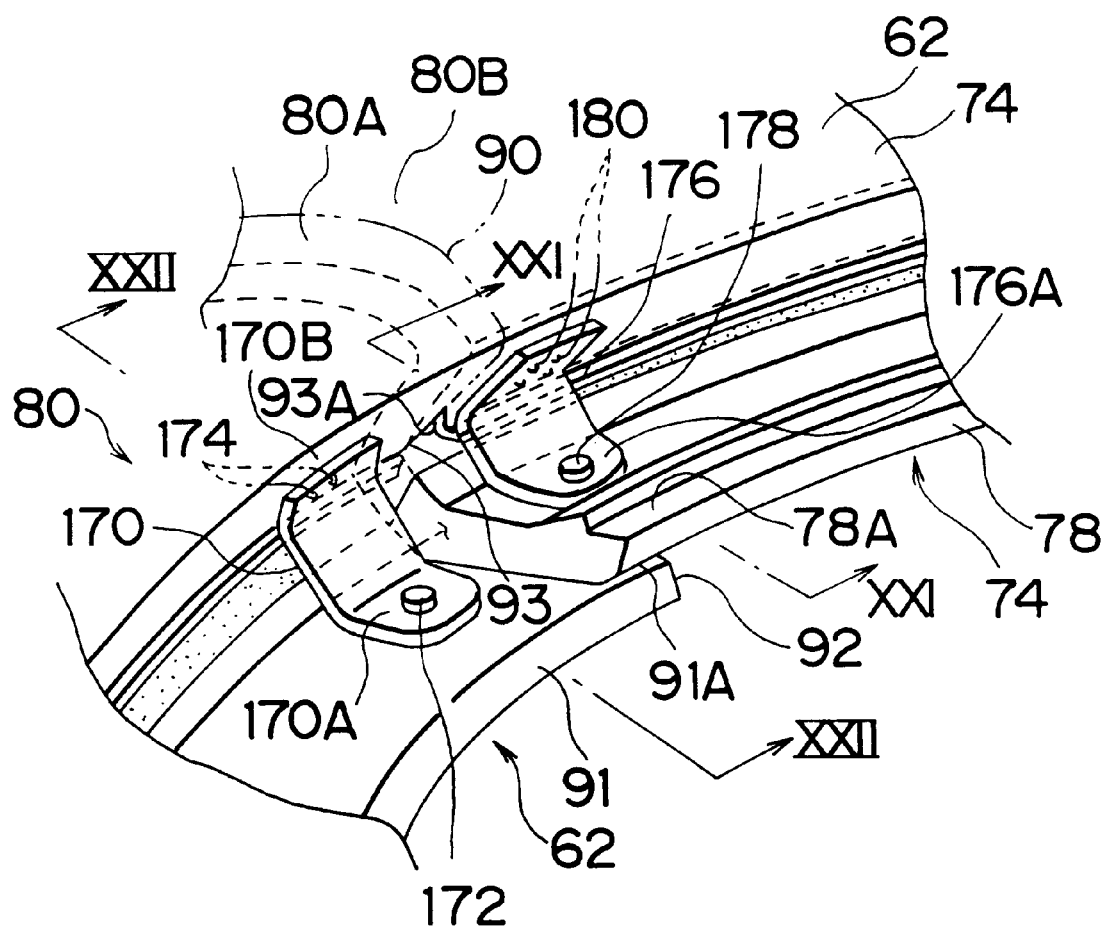

INSTRUMENT PANEL INTEGRALLY EQUIPPED WITH AIR BAG DOOR PORTION

The disclosed contents of Japanese Patent Applications Nos. HEI 9-277350 filed on Oct. 9, 1997 and HEI 10-201812 filed on Jul. 16, 1998 including the specifications, drawings and abstracts are incorporated herein by reference in their entirety.

BACKGROUND OF THE INVENTION

1. Field of the Invention

The present invention relates to an instrument panel integrally equipped with an air bag door portion and, more particularly, relates to an instrument panel integrally equipped with an instrument panel of a type that is divided into upper and lower portions or into front and rear portions.

2. Description of the Related Art

Japanese Patent Application Laid-Open No. HEI 5-58517 discloses an example of a construction wherein an air bag door portion of passenger-side air bag device is integrated into an instrument panel.

As shown in FIG. 28, an instrument panel 200, which is integrally equipped with the air bag door portion, has a three-layer structure composed of an instrument panel insert 202, a foamed layer 204 and a skin 206. An opening 208 is formed through the instrument panel insert 202 at a predetermined location on the passenger-side. An air bag device 212 is disposed at a location that faces the opening 208. The air bag device 212 causes an air bag body 210 to swell toward the passenger-side when a predetermined high load is applied.

Door inserts 214, 216 are fixed to the opening 208 of the instrument panel insert 202 through a fastening member 218 such as a rivet or the like, whereby the opening 208 is closed. A breakage line 220, which is to be broken at the time of deployment of the air bag body, is formed in the skin 206 at a location close to the border between the door inserts 214, 216.

However, according to the thus-constructed instrument panel integrally equipped with the air bag door portion, the tear line (breakage line) for cleavage of the door portion is exposed to a design surface, so that the designing freedom is restricted and the overall quality of the outward appearance deteriorates. Especially when the instrument panel is of a type divided into upper and lower portions or into front and rear portions, a parting line that separates those divided portions from each other is also exposed to the design surface. As a result, the designing freedom is further restricted and the overall quality of the outward appearance further deteriorates.

SUMMARY OF THE INVENTION

In view of the aforementioned facts, the present invention aims at providing an instrument panel equipped with an air bag door portion of a divided type that is capable of reducing restrictions on designing freedom resulting from a break line and a parting line of the air bag door portion and inhibiting the overall quality of the outward appearance from deteriorating.

A first aspect of the present invention provides an instrument panel integrally equipped with an air bag door portion of a type that is divided into upper and lower instrument panels. This instrument panel includes a base of an upper air bag door portion for closing an opening for deployment of an air bag body and a base of a lower air bag door portion for closing an opening for deployment of the air bag body. The former opening is formed in a base of the upper instrument panel and the latter opening is formed in a base of the lower instrument panel. In this instrument panel, one end of the base of the upper air bag door portion and one end of the base of the lower air bag door portion are fixed to the base of the upper instrument panel and the base of the lower instrument panel respectively, and the other free end of the base of the upper air bag door portion and the other free end of the base of the lower air bag door portion are disposed along a parting line that separates the upper instrument panel from the lower instrument panel. Also, at least the free end of the base of the lower air bag door portion is set wider than the fixed end thereof. In addition, the lower instrument panel including the lower air bag door portion is entirely covered with a single skin.

Accordingly, when the air bag body is deployed, the base of the upper air bag door portion and the base of the lower air bag door portion are pressed against the air bag body and displaced from the sides of the respective free ends toward the inside of a passenger compartment. Hence, the upper and lower air bag door portions are cloven respectively along the parting line of the instrument panel. Furthermore, since at least the free end of the base of the lower air bag door portion is set wider than the fixed end thereof, the air bag door portion of the lower instrument panel is cloven like a fish mouth along the parting line of the instrument panel. In addition, the cleavage line between the air bag door portions of the upper and lower instrument panels coincides with the parting line of the instrument panel, and the lower instrument panel including the lower air bag door portion is entirely covered with a single skin. Therefore, the contour of the air bag door portion of the lower instrument panel becomes apparently indiscernible (invisible), whereby a high degree of designing freedom as well as an attractive outward appearance can be achieved. Moreover, the cleavage line of the upper and lower air bag door portions coincides with the parting line of the instrument panel, and the upper and lower air bag door portions are separated from each other. Thus, the air bag body can be deployed at a lower pressure and the instrument panel can be formed with ease.

A second aspect of the present invention provides an instrument panel integrally equipped with an air bag door portion of a type that is divided into front and rear instrument panels. This instrument panel includes a base of a front air bag door portion for closing an opening for deployment of an air bag body and a base of a rear air bag door portion for closing an opening for deployment of the air bag body. The former opening is formed in a base of the front instrument panel, and the latter opening is formed in a base of the rear instrument panel. In this instrument panel, one end of the base of the front air bag door portion and one end of the base of the rear air bag door portion are fixed to the base of the front instrument panel and the base of the rear instrument panel respectively, and the other free end of the base of the front air bag door portion and the other free end of the base of the rear air bag door portion are disposed along a parting line that separates the front instrument panel from the rear instrument panel. Also, at least the free end of the base of the rear air bag door portion is set wider than an air bag case, and the rear air bag door portion is set to such a dimension as to reach a point where an extended line of a hinge line of the rear air bag door portion intersects with the parting line and to reach a vehicle lateral outside end portion of the rear instrument panel.

Accordingly, when the air bag body is deployed, the base of the front air bag door portion and the base of the rear air bag door portion are pressed against the air bag body and displaced from the sides of the respective free ends toward the inside of the passenger compartment. Hence, the front and rear air bag door portions are cloven respectively along the parting line of the instrument panel. Furthermore, at least the free end of the base of the rear air bag door portion is set wider than the air bag case, and the rear air bag door portion is set to such a dimension as to reach a point where an extended line of a hinge line of the rear air bag door portion intersects with the parting line and to reach a vehicle lateral outside end portion of the rear instrument panel. Therefore, the air bag door portion of the rear instrument panel is cloven solely along the parting line of the instrument panel. Furthermore, since the contour of the air bag door portion of at least the rear instrument panel is invisible, a high degree of designing freedom as well as an attractive outward appearance can be achieved. Moreover, the cleavage line of the front and rear air bag door portions coincides with the parting line of the instrument panel, and the front and rear air bag door portions are separated from each other. Thus, the air bag body can be deployed at a lower pressure and the instrument panel can be formed with ease.

In the first and second aspects of the present invention, a fragile portion may be formed at an end portion of the skin of the upper or front instrument panel and on an elongation of the side tear line. In this case, the fragile portion serves as a starting point of cleavage when the air bag door portion is deployed. In this construction, if the base of the upper or front air bag door portion is displaced from the side of the free end thereof toward the inside of the passenger compartment at the time of deployment of the air bag body, the skin of the upper or front instrument panel is rapidly cloven and deployed, with the fragile portion serving as a starting point of cleavage. Herein, the fragile portion is formed at the end portion of the skin of the upper or front instrument panel and on the elongation of the side tear line.

Furthermore, in the first and second aspects of the present invention, the skin of the upper or front instrument panel may be provided with a side tear line at a location substantially opposed to the vehicle lateral opposed ends of the base of the upper or front air bag door portion The side tear line extends in a direction in which the air bag door portion is cloven during deployment thereof.

In addition, in the first and second aspects of the present invention, the instrument panel may have skin holding means for holding the skin that is outside the air bag door portion-and adjacent to the side tear line onto the base of the upper instrument panel. In this construction, the skin holding means holds the skin of the door portion-outside section adjacent to the side tear line of the upper or front air bag door portion onto the base of the upper or front instrument panel. Accordingly, there is no possibility of an end portion of the skin being turned up in response to the deployment of the air bag door portion. Besides, it is possible to reliably break the skin along the predetermined side tear line.

Furthermore, in the first and second aspects of the present invention, the instrument panel may have door-side skin holding means for holding the air bag door portion-side skin adjacent to the side tear line onto the base of the upper or front air bag door portion. In this construction, the skin holding means and the door-side skin holding means can hold the skin at two points that are located opposite to each other across the side tear line. Thus, it is possible to break the skin more reliably along the side tear line.

Moreover, in the first and second aspects of the present invention, the side tear line may be invisible. In this construction, the outward appearance becomes more attractive.

In addition, in the first and second aspects of the present invention, the instrument panel may further include a garnish extending in a vehicle lateral direction so as to cover an upper or front end portion of the air bag door portion and an upper or front end portion of the side tear line from the inside of the passenger compartment. In this construction, the upper or front end portion of the side tear line is hidden behind the garnish and thus not exposed to a design surface. Consequently, the side tear line is less extensively exposed to the design surface, whereby the overall quality of the outward appearance can be enhanced with ease.

Still further, in the first and second aspects of the present invention, the instrument panel may have a fastening member for fastening a hinge portion of the base of the upper or front air bag door portion to a side of an air bag case and a protection plate for covering the fastening member from a location below and adjacent to the fastening member. In this construction, the protection plate prevents the hinge portion of the upper or front air bag door portion from being damaged due to an expansion force of the air bag body. The protection plate also prevents the fastening member from dropping.

A third aspect of the present invention provides an instrument panel integrally equipped with an air bag door portion of a type that is divided into front and rear instrument panels. In this instrument panel, the air bag door portion is a single air bag door portion whose one end is fixed to one of the base of the front instrument panel and the base of the rear instrument panel and whose other end is a free end disposed along a parting line that separates the front instrument panel from the rear instrument panel.

Accordingly, when the air bag body is deployed, the base of the air bag door portion is pressed against the air bag body and displaced from the side of the free end thereof toward the inside of the passenger compartment. Then, the single air bag door portion is cloven along the parting line and deployed toward the inside of the passenger compartment. Consequently, the contour of the air bag door portion of the instrument panel can be made invisible. In the instrument panel of a division type, therefore, it is possible to reduce restrictions on designing freedom resulting from a breakage line or a parting line of the air bag door portion and to inhibit the overall quality of the outward appearance from deteriorating.

BRIEF DESCRIPTION OF THE DRAWINGS

The foregoing and further objects, features and advantages of the present invention will become apparent from the following description of preferred embodiments with reference to the accompanying drawings, wherein:

FIG. 11 is a cross-sectional view corresponding to FIG. 4, partially showing the instrument panel integrally equipped with the air bag door portion according to one variation of the first embodiment of the present invention;

FIG. 12 is a cross-sectional view corresponding to FIG. 4, partially showing the instrument panel integrally equipped with the air bag door portion according to one variation of the first embodiment of the present invention;

FIG. 13 is a cross-sectional view corresponding to FIG. 4, partially showing the instrument panel integrally equipped with the air bag door portion according to one variation of the first embodiment of the present invention;

FIG. 20 is an enlarged perspective view partially showing an instrument panel integrally equipped with an air bag door portion according to a variation of a third embodiment of the present invention, as viewed from a location diagonally rearward of a vehicle;

DETAILED DESCRIPTION OF PREFERRED EMBODIMENTS

An instrument, panel integrally equipped with an air bag door portion according to one embodiment of the present invention will be described in detail with reference to FIGS. 1 through 10.

In each of the drawings, arrows FR and UP indicate forward and upward directions of a vehicle respectively.

Figure 1:
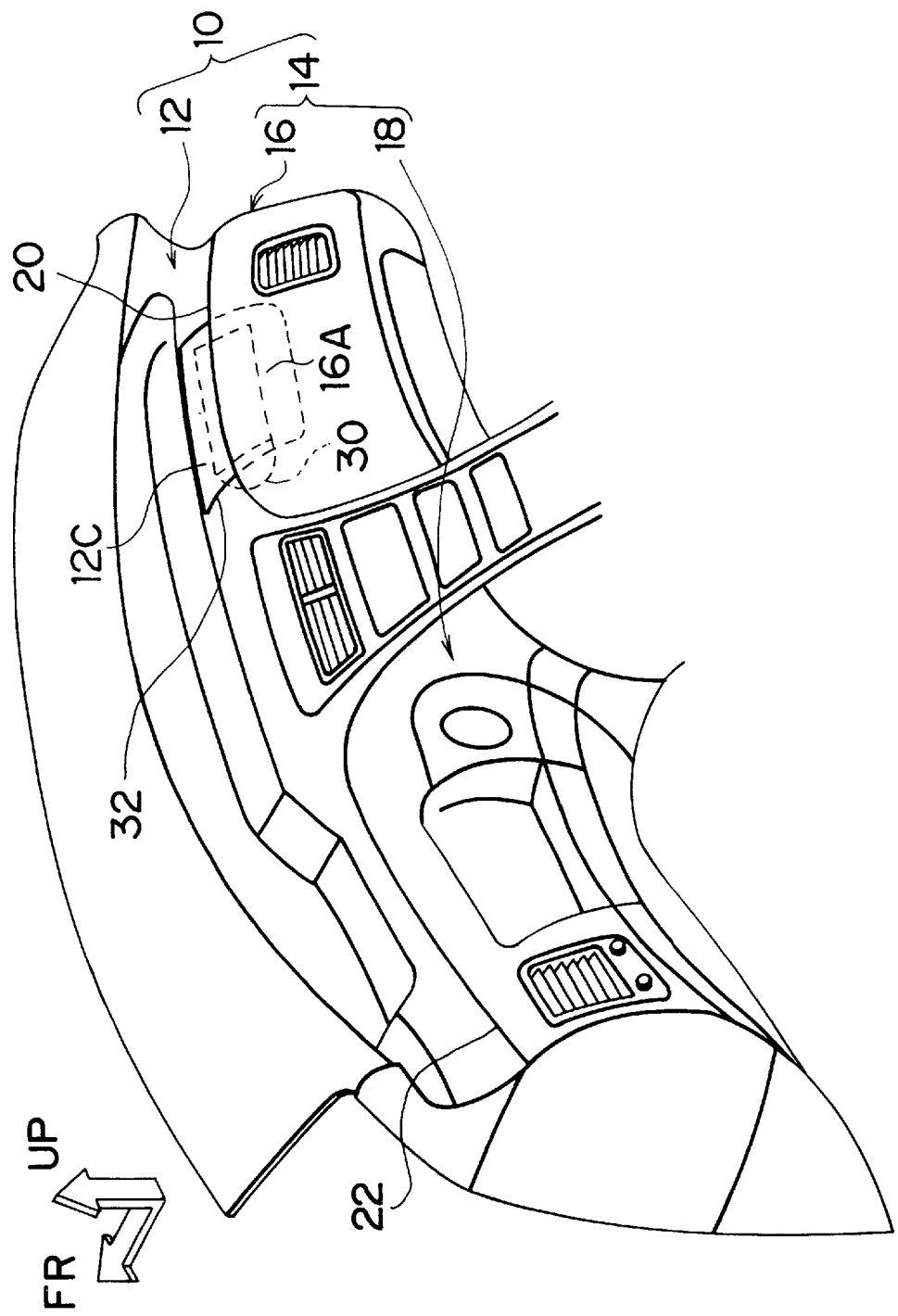
FIG. 1 is a perspective view showing an instrument panel integrally equipped with an air bag door portion according to a first embodiment of the present invention, as viewed from a location diagonally rearward of a vehicle.

As shown in FIG. 1, an instrument panel 10 according to the present embodiment is of a type that is divided into upper and lower portions. That is, the instrument panel 10 is composed of an upper panel 12 as an upper instrument panel and a lower panel 14 as a lower instrument panel. The lower panel 14 is divided into a passenger-side lower panel 16 and a driver-side lower panel 18. While a parting line 20 is formed so as to separate the upper panel 12 from the passenger-side lower panel 16, a parting line 22 is formed so as to separate the upper panel 12 from the driver-side lower panel 18.

Figure 3:
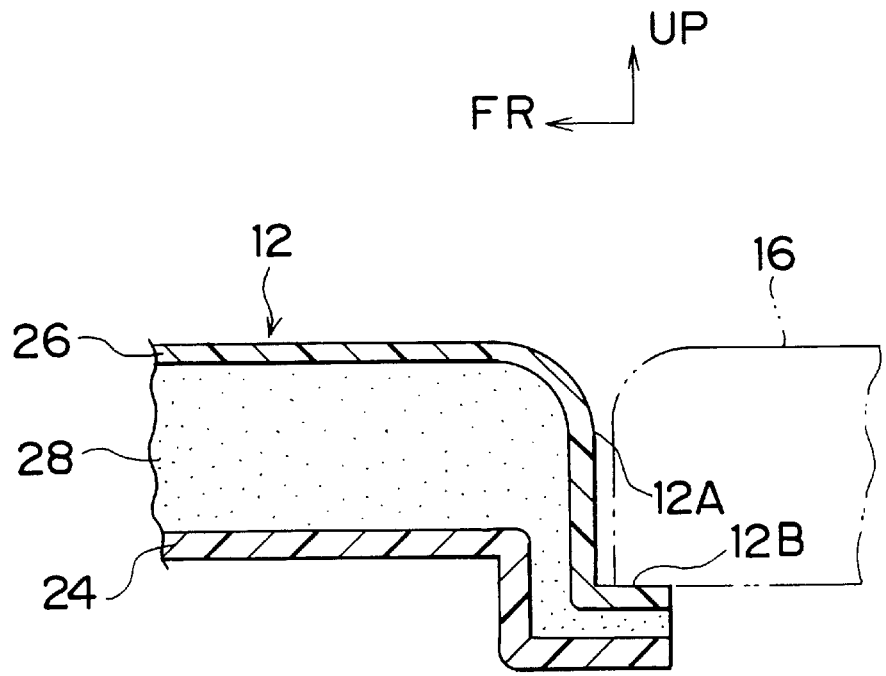
FIG. 3 is an enlarged partial cross-sectional view taken along line III—III in FIG. 2.

As shown in FIG. 3, the upper panel 12 is formed as what is called an integrally foamed type, which is equipped with a base 24, a skin 26 and a foamed layer 28 disposed between the base 24 and the skin 26. A border portion 12A of the upper panel 12 adjacent to the passenger-side lower panel 16 is bent downwards. A flange 12B extending toward the passenger-side lower panel 16 is formed at a lower end portion of a thus-bent portion 12A of the upper panel 12.

Figure 2:
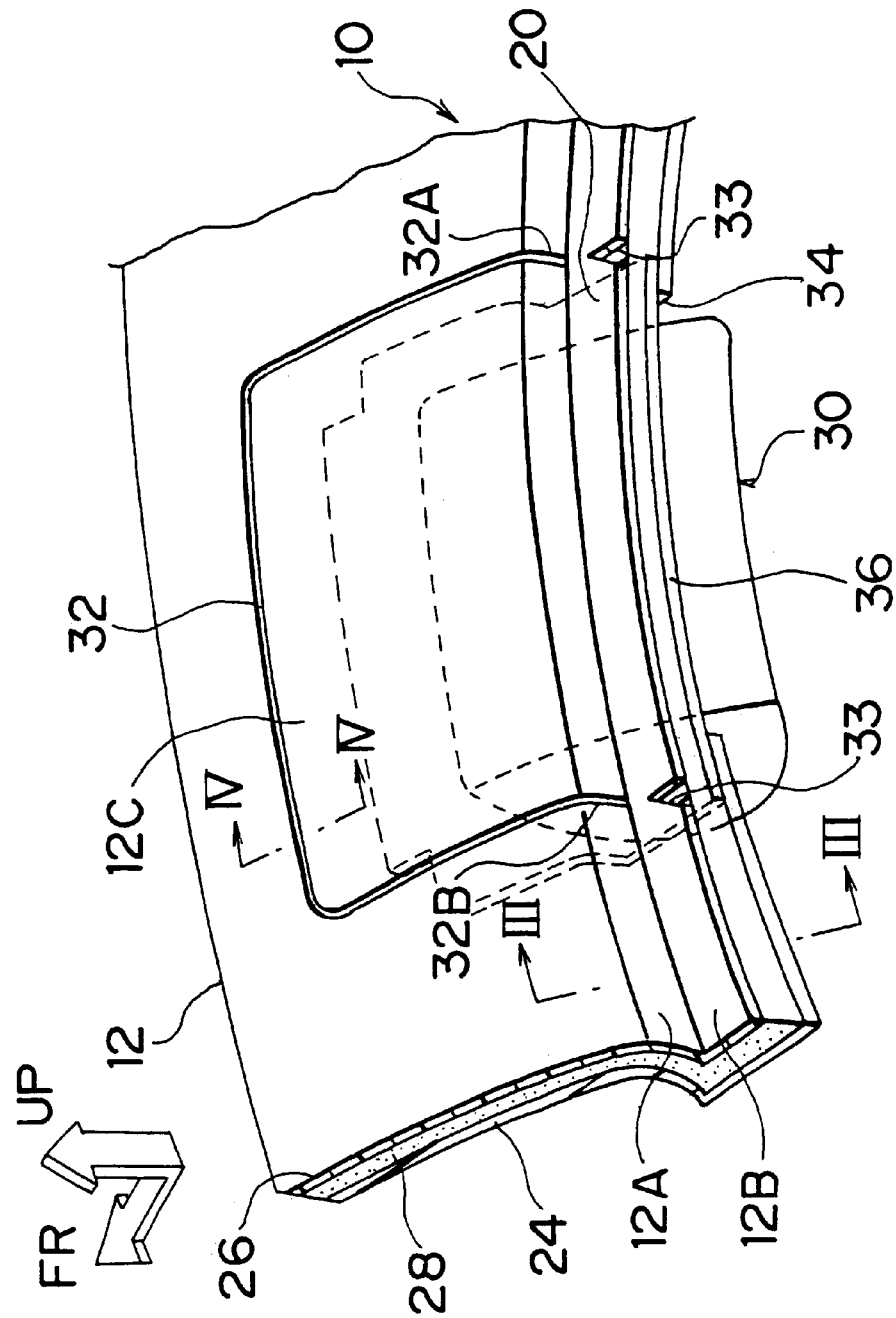
FIG. 2 is a partial perspective view showing a cross section of an upper panel of the instrument panel integrally equipped with the air bag door portion according to the first embodiment of the present invention, as viewed from a location diagonally rearward of the vehicle.

As shown in FIG. 2, a rectangular upper air bag door portion 12C is formed on the passenger-side of the upper panel 12 at a location substantially opposed to an air bag device 30 disposed inside the instrument panel 10. A lower end (free end) of the upper air bag door portion 12C is disposed along the parting line 20. A notch-like tear line 32, which is substantially U-shaped in a planar view, is formed in the skin 26 so as to define upper, left and right ends of the upper air bag door portion 12C.

The air bag device 30 can have any type of well-known construction equipped with a substantially box-shaped air bag case, a substantially cylindrical inflator fixed within the air bag case, and an air bag body disposed in a folded state on the side of an opening of the inflator. Therefore, the description of the air bag device 30 will be omitted. The air bag case is fixed to a vehicle frame member such as an instrument panel reinforcement or the like, which is not shown in the drawing.

Figure 4:
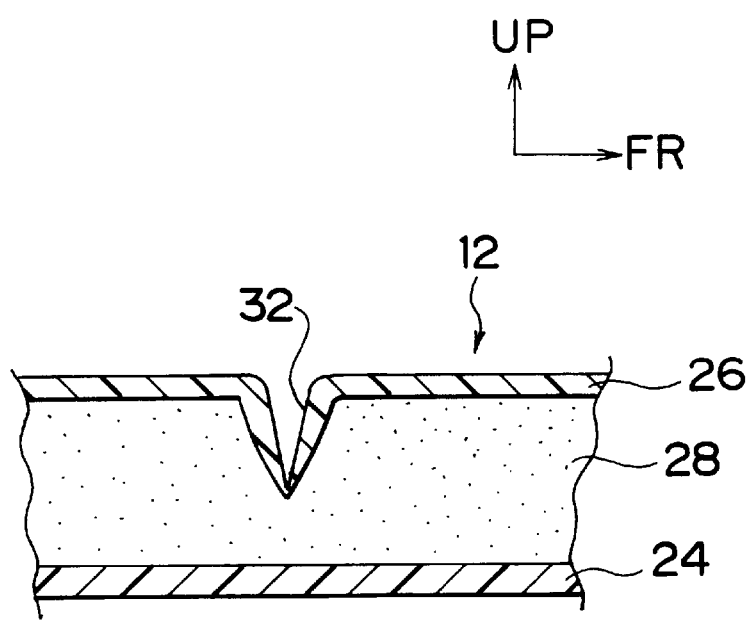
FIG. 4 is an enlarged partial cross-sectional view taken along line IV—IV in FIG. 2.

As shown in FIG. 4, the tear line 32 has a substantially U-shaped or V-shaped cross-section (a long U-type). As shown in FIG. 2, the tear line 32 has two end portions 32A, 32B that reach the bent portion 12A. A V-shaped notch 33, which is a fragile portion serving as a starting point of cleavage, is formed in the flange 12B at a location opposed to each of the end portions 32A, 32B of the tear line 32.

Figure 5:
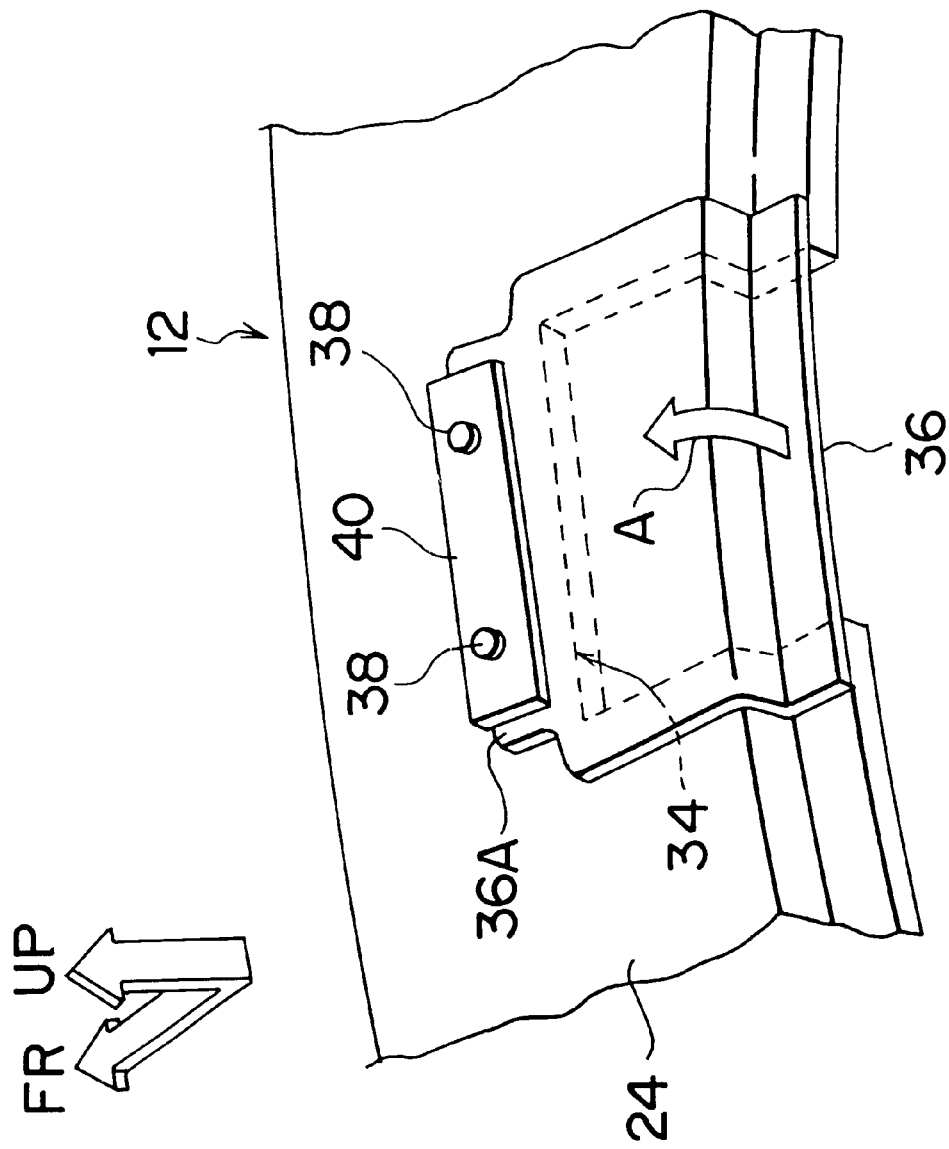
FIG. 5 is a partial perspective view showing a base of the upper panel of the instrument panel integrally equipped with the air bag door portion according to the first embodiment of the present invention, as viewed from a location diagonally rearward of the vehicle.

As shown in FIG. 5, an opening 34 is formed in the base 24 of the upper panel 12 at a location substantially opposed to the air bag device, and the opening 34 is closed by an upper door insert 36 as a base of the upper air bag door portion. An upper edge portion 36A of the upper door insert 36 is attached to an upper line portion of the opening 34 of the base 24 through a fastening portion reinforcement bracket 40, using fastening members 38 such as bolts, nuts, rivets and the like. The upper door insert 36 is designed to be opened substantially upwards (in a direction indicated by an arrow A in FIG. 5), while the upper edge portion 36A serves as a hinge portion.

Figure 6:
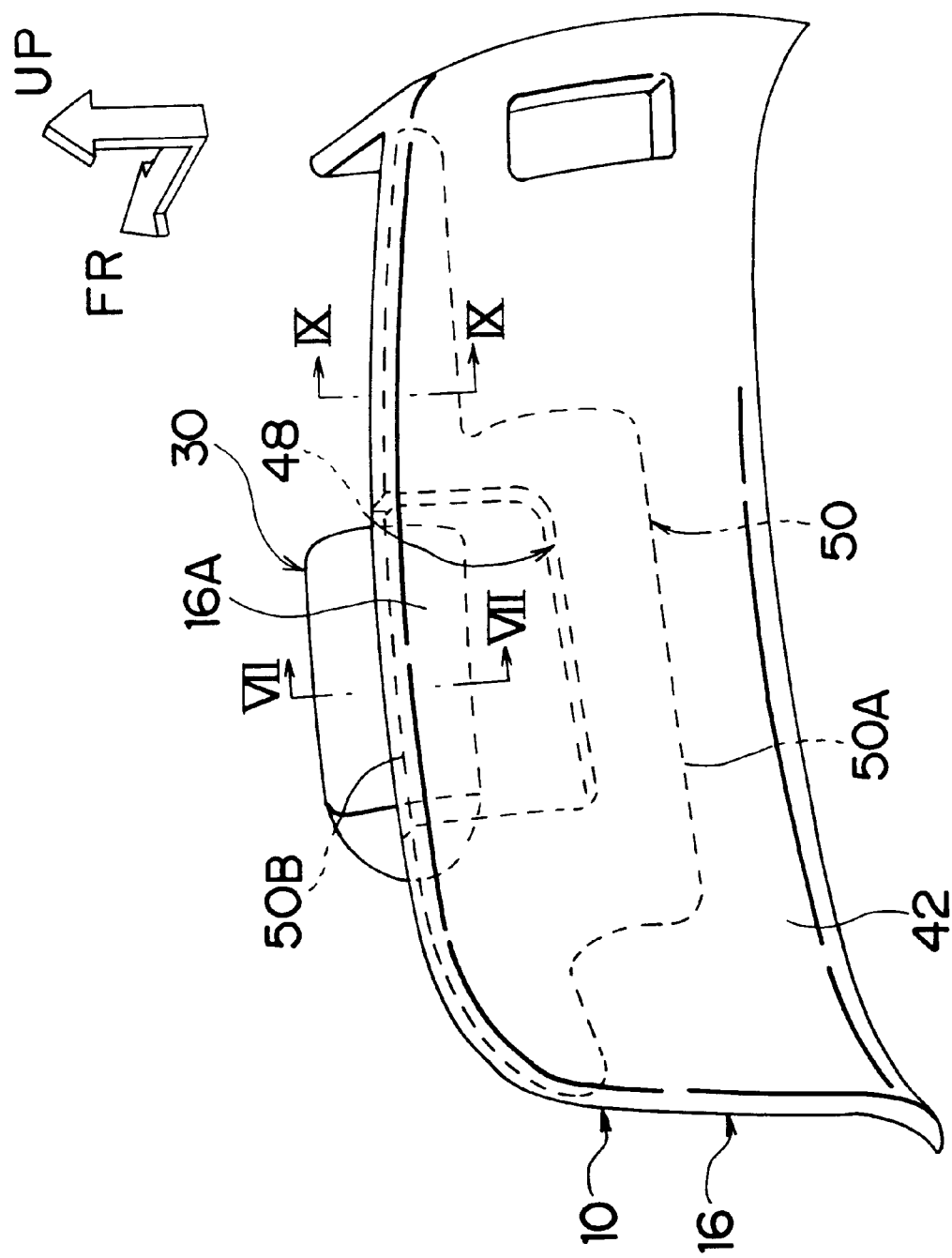
FIG. 6 is a perspective view showing a passenger-side lower panel of the instrument panel integrally equipped with the air bag door portion according to the first embodiment of the present invention, as viewed from a location diagonally rearward of the vehicle.

As shown in FIG. 6, the air bag device 30 is disposed inside the passenger-side lower panel 16, which has a lower air bag door portion 16A at a location substantially opposed to the air bag device 30.

Figure 7:
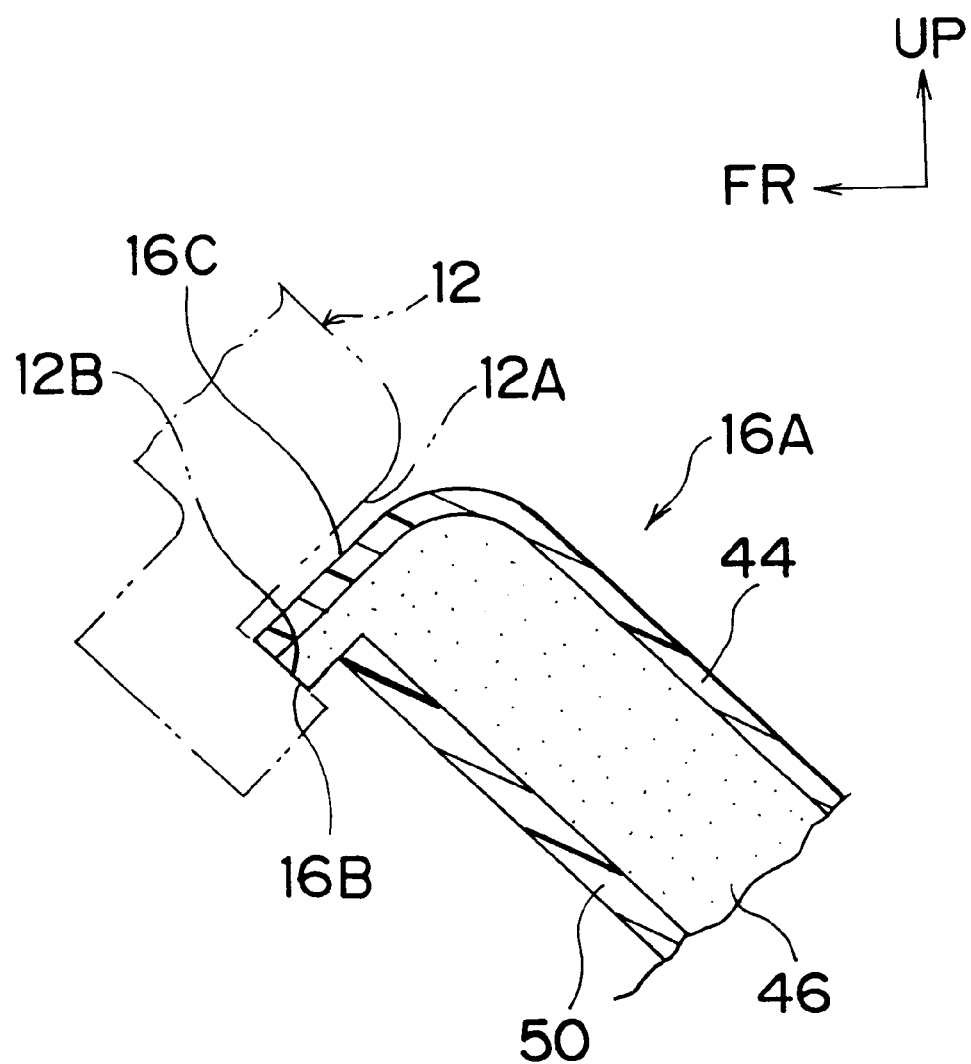
FIG. 7 is an enlarged partial cross-sectional view taken along line VII—VII in FIG. 6.

As shown in FIG. 7, the lower air bag door portion 16A is an integrally foamed type, which is equipped with a lower door insert 50 as a base of the lower air bag door portion, a skin 44, and a foamed layer 46 disposed between a base 42 (shown in FIG. 8) and the skin 44. The entire surface of the passenger-side lower panel 16 including the lower air bag door portion 16A is covered with the skin 44. The passenger-side lower panel 16 has a border end face 16C adjacent to the upper panel 12, which border end face 16C is also covered with the skin 44. Furthermore, the passenger-side lower panel 16 has on a back face thereof a lateral end portion 16B, which abuts on an upper face of the flange 12B of the upper panel 12.

Figure 8:
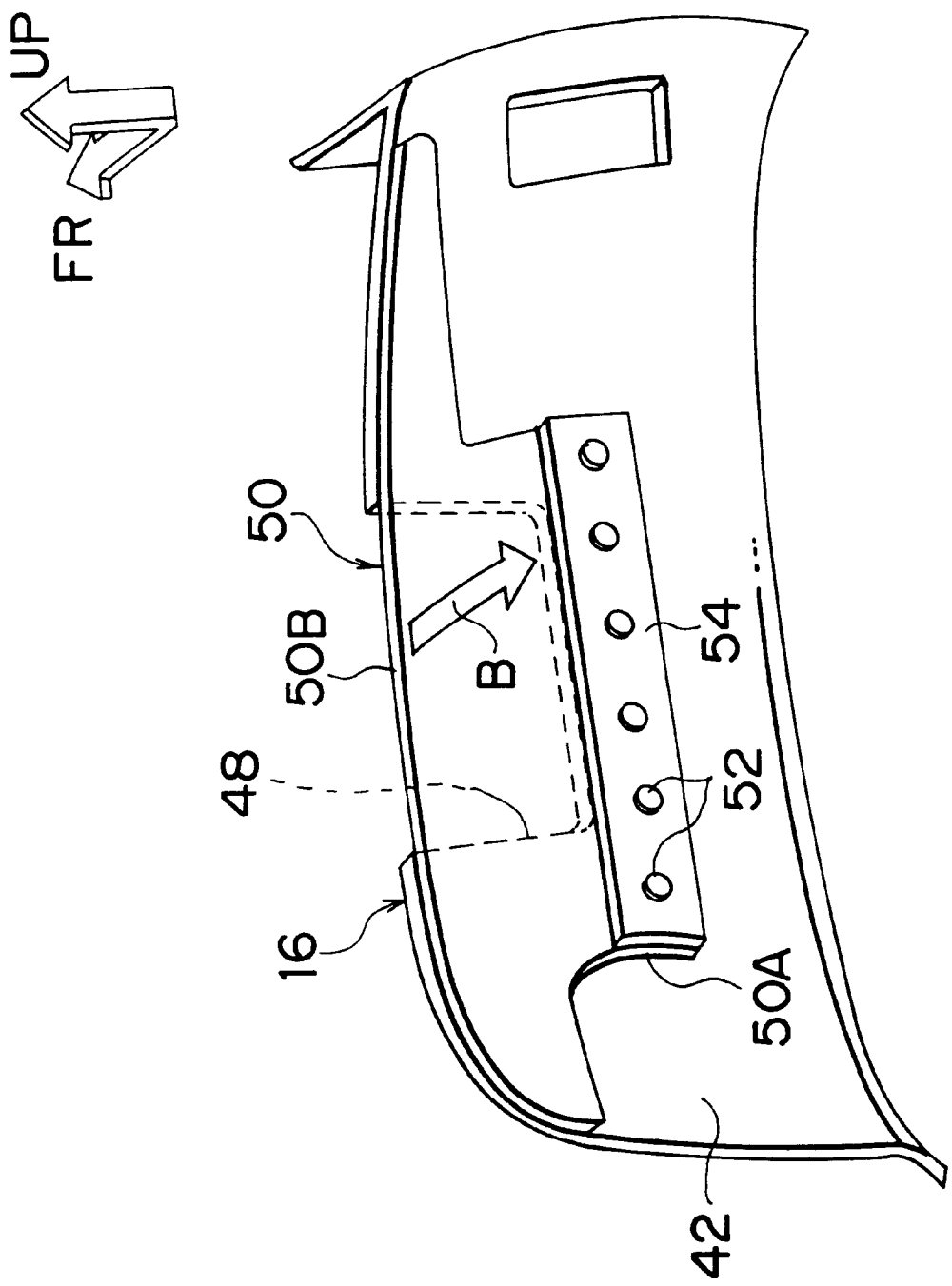
FIG. 8 is a perspective view showing a base of the passenger-side lower panel of the instrument panel integrally equipped with the air bay door portion according to the first embodiment of the present invention, as viewed from a location diagonally rearward of the vehicle.
Figure 9:
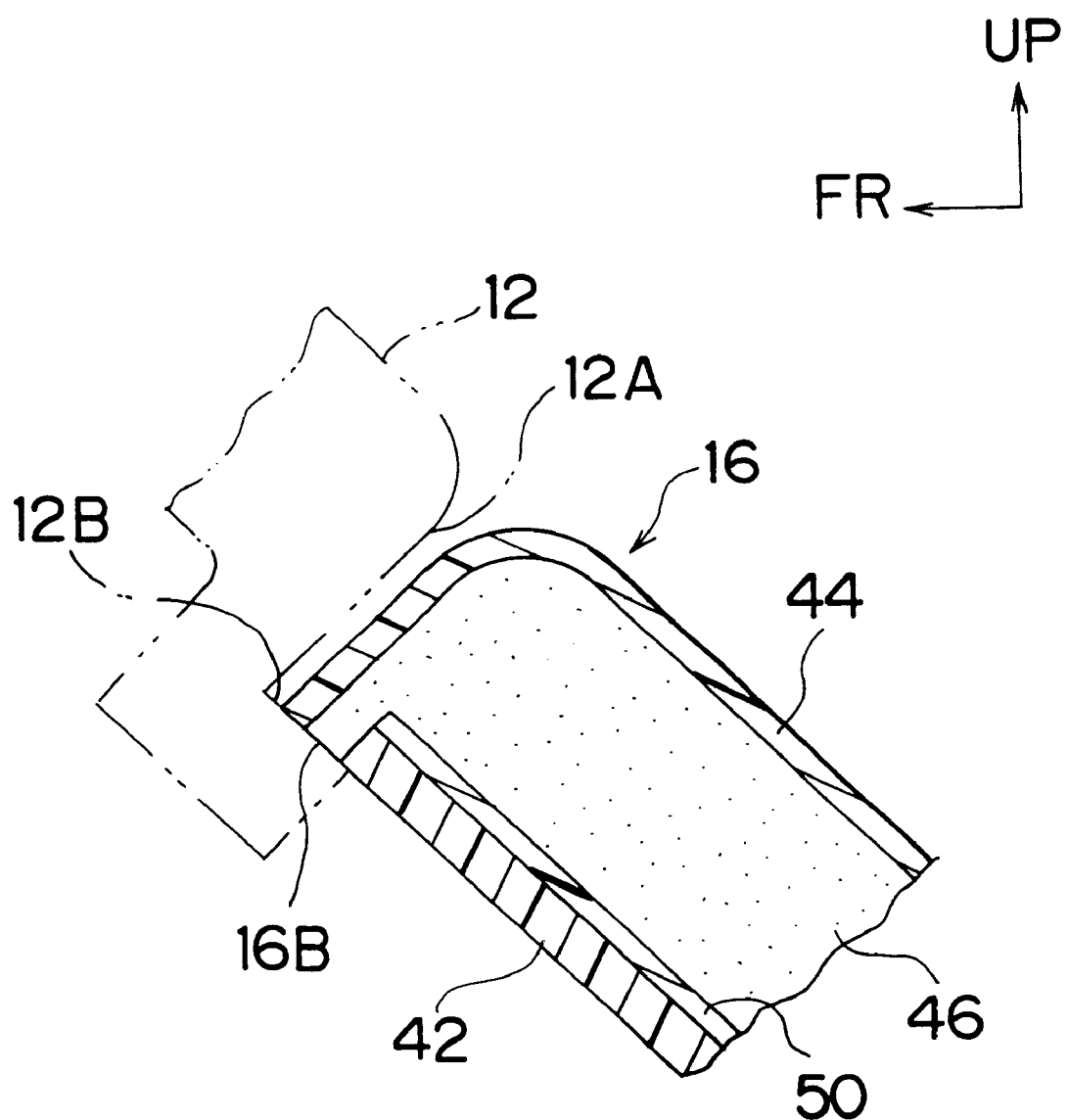
FIG. 9 is an enlarged partial cross-sectional view taken along line in FIG. 6.

As shown in FIG. 8, a rectangular opening 48 is formed in the base 42 of the passenger-side lower panel 16 at a location substantially opposed to the air bag device. The opening 48 is closed by the lower door insert 50 as a base of the lower air bag door portion. A lower edge portion (fixed end) 50A of the lower door insert 50 is attached to a lower line portion of the opening 48 of the base 42 through a fastening portion reinforcement bracket 54, using fastening members 52 such as bolts, nuts, rivets and the like. The lower door insert 50 is designed to be opened substantially rearwards (in a direction indicated by an arrow B in FIG. 8) from the side of an upper edge portion 50B as a free end, while the lower edge portion 50A as a fixed end serves as a hinge portion. The lower door insert 50 extends in a lateral direction of the vehicle on the side of the upper edge portion 50B (free end), which is wider than the lower edge portion 50A (fixed end). Hence, as shown in FIG. 9, the lower door insert 50 extends between the base 42 and the foamed layer 46 at locations leftward and rightward of the opening 48.

The preferred operation of the present embodiment will now be described.

In the present embodiment, if a predetermined high load or impact is applied to a vehicle body, an unshown air bag sensor detects that high load, whereby the inflator of the air bag device 30 is activated. Thus, a large amount of gas is generated to expand the air bag body, so that the upper air bag door portion 12C of the upper panel 12 and the lower air bag door portion 16A of the passenger-side lower panel 16 are pushed from respective back sides thereof.

Figure 10:
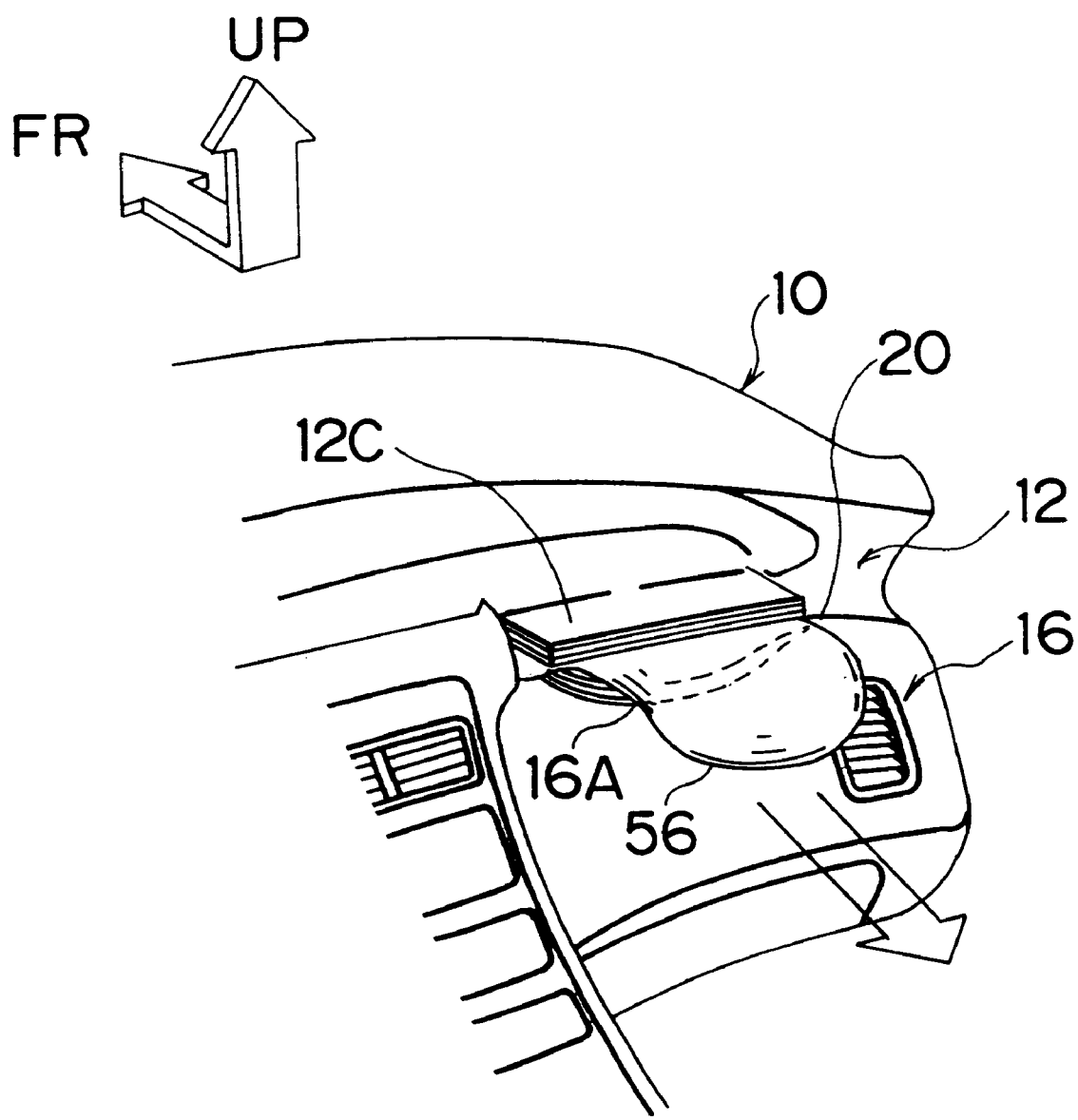
FIG. 10 is a partial perspective view showing a state where an air bag body of the instrument panel integrally equipped with the air bag door portion according to the first embodiment of the present invention is being deployed, as viewed from a location diagonally rearward of the vehicle.

In this state, in the upper air bag door portion 12C of the upper panel 12, a swelling load (expansion pressure) from the air bag body is transmitted to the upper door insert 36. Then, as shown in FIG. 10, the upper air bag door portion 12C of the upper panel 12 is opened upwards. In the present embodiment, as shown in FIG. 2, the notch 33 is formed in the flange 12B of the upper panel 12, and the tear line 32 is formed in the upper air bag door portion 12C. Accordingly, starting from the notch 33, the skin 26 and the foamed layer 28 are smoothly cloven.

In the passenger-side lower panel 16, a swelling load (expansion pressure) from the air bag body is transmitted to the lower door insert 50. In this state, as shown in FIG. 8, the lower door insert 50 extends in the lateral direction of the vehicle on the side of the upper edge portion (free end) 50B, which is wider than the lower edge portion (fixed end) 50A. Thus, as shown in FIG. 10, a vehicle lateral center portion of the upper edge portion of the passenger-side lower panel 16 is opened like a fish mouth along the parting line 20.

Consequently, as shown in FIG. 10, an air bag body 56 is expanded and deployed rapidly and reliably toward the inside of the passenger compartment, from the opening formed along the border between the upper air bag door portion 12C of the upper panel 12 and the lower air bag door portion 16A of the passenger-side lower panel 16.

As described above, in the present embodiment, the cleavage line between the upper air bag door portion 12C and the lower air bag door portion 16A coincides with the parting line 20 of the instrument panel 10. Furthermore, the entire surface of the passenger-side lower panel 16 including the lower air bag door portion 16A is covered with the skin 44, so that the contour of the door is invisible from outside. Accordingly, a high degree of designing freedom as well as an attractive outward appearance can be achieved. Also, the parting line 20 of the instrument panel 10 coincides with the cleavage line of the door portion, and the upper air bag door portion 12C of the upper panel 12 and the lower air bag door portion 16A of the passenger-side lower panel 16 are two separate bodies. Thus, the air bag body can be deployed at a lower pressure and a molding process can be carried out with ease.

In addition, in the present embodiment, the tear line 32 is formed as a parting line in the skin 26 along a periphery of the upper air bag door portion 12C. Therefore, the skin 26 of the upper air bag door portion 12C is smoothly cloven and deployed, with the tear line 32 serving as a starting point of cleavage.

Although the lower panel 14 is divided into the passenger-side lower panel 16 and the driver-side lower panel 18 in the present embodiment, the passenger-side lower panel 16 and the driver-side lower panel 18 may be structurally integrated with each other. Furthermore, the upper panel 12 and the driver-side lower panel 18 may also be structurally integrated with each other. In other words, a construction wherein the instrument panel 10 is divided into upper and lower portions only on the side of the passenger is also acceptable.

In the present embodiment, as shown in FIG. 4, the notch constitutes the tear line 32. However, instead of forming the notch, as shown in FIGS. 11 through 13, a so-called fastener type may also be employed wherein the end portion 26A of the skin 26 of the upper air bag door portion 12C and the end portion 26B of the skin of the body portion are preliminarily formed separately from each other and then positioned in engagement with each other. As seen in FIGS. 11, 12 and 13, the end portions 26A', 26A", and 26A'" and end portions 26B', 26B" and 26B'" can be formed in a variety of interlocking configurations.

Figure 14:
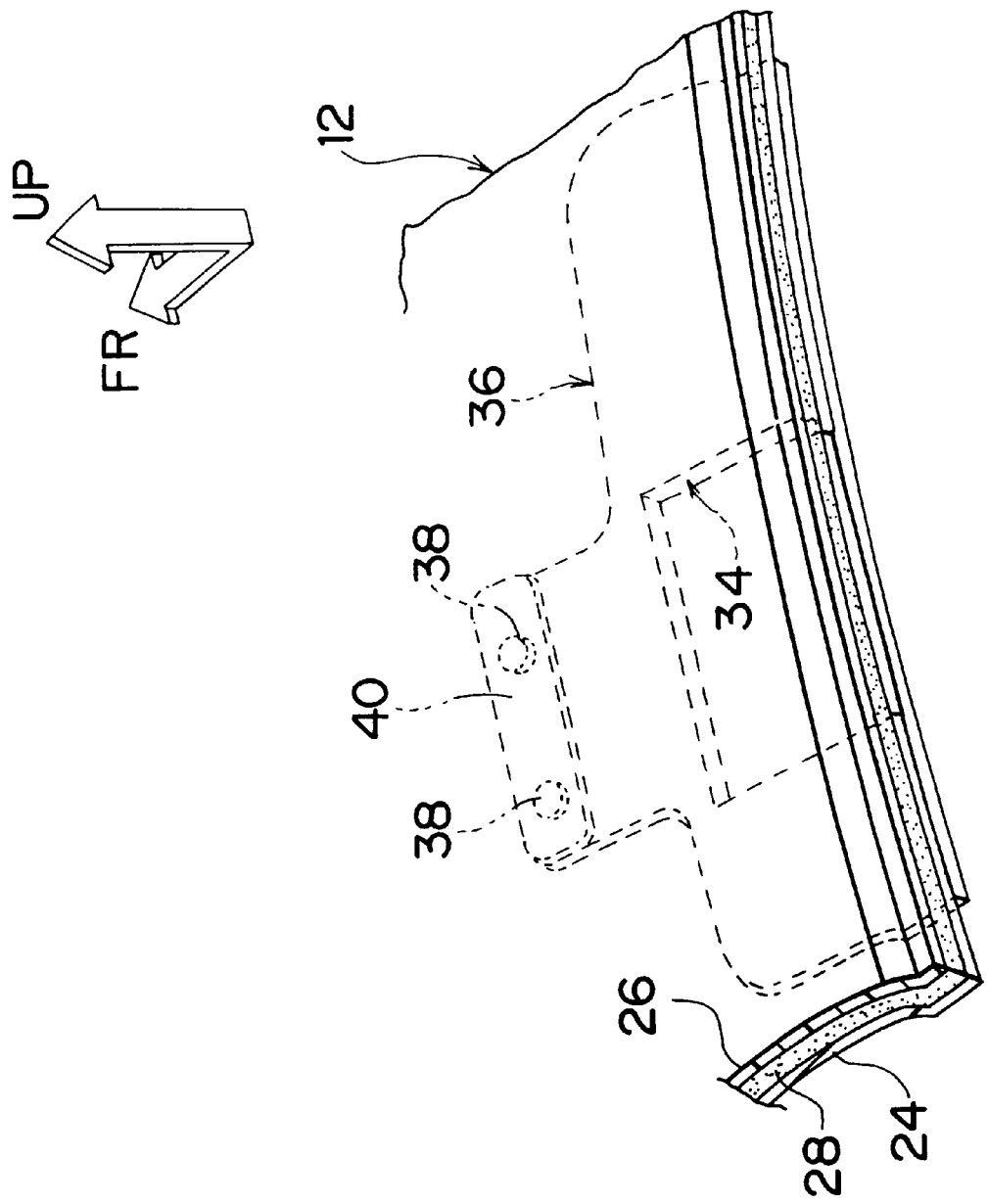
FIG. 14 is a partial perspective view showing a cross section of an upper panel of the instrument panel integrally equipped with the air bag door portion according to another variation of the first embodiment of the present invention, as viewed from a location diagonally rearward of the vehicle.

In addition, as shown in FIG. 14, it is also possible to adopt a construction wherein the upper air bag door portion 12C is opened like a fish mouth in the same manner as the lower air bag door portion 16A.

An instrument panel integrally equipped with an air bag door portion according to a second embodiment of the present invention will now be described in detail with reference to FIGS. 15 through 19.

Like components are denoted by like reference numerals in both the first and second embodiments, and those components already described in relation to the first embodiment will not be described again below.

Figure 15:
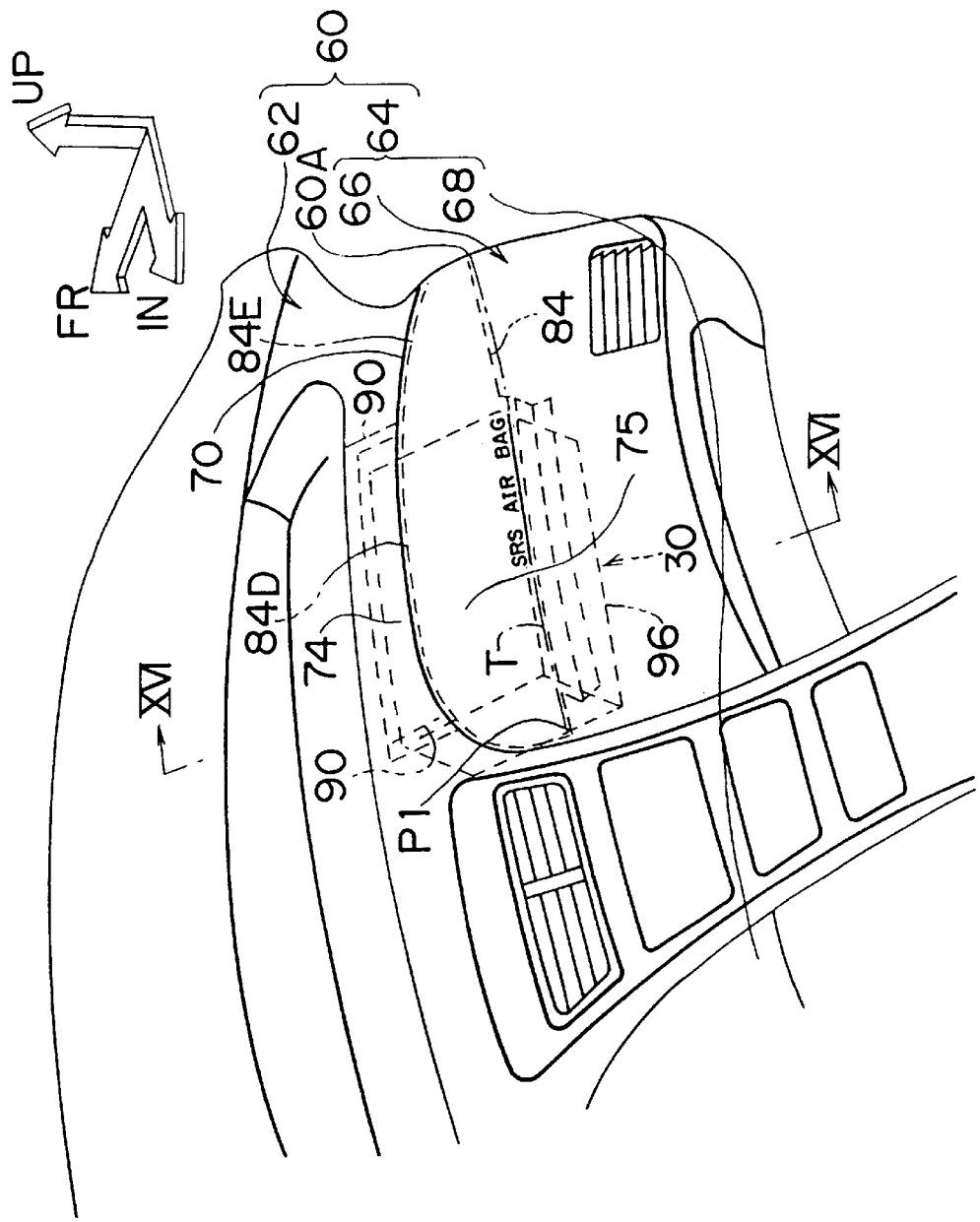
FIG. 15 is a partial perspective view showing a passenger-side portion of the instrument panel integrally equipped with the air bag door portion according to the second embodiment of the present invention, as viewed from a location diagonally rearward of the vehicle.

As shown in FIG. 15, an instrument panel 60 of the present embodiment is of a type that is divided into front and rear portions That is, the instrument panel 60 is composed of a front panel 62 as a front instrument panel and a rear panel 64 as a rear instrument panel. The rear panel 64 is divided into a passenger-side rear panel 66 and a driver-side rear panel 68. A parting line 70 is formed so as to separate the front panel 62 from the passenger-side rear panel 66. The parting line 70 is an arcuate curve swollen forwards with respect to the front of the vehicle.

A rectangular front air bag door portion 74 is formed on the passenger-side of the front panel 62 at a location substantially opposed to the air bag device 30 disposed inside the instrument panel 60. A rear end (free end) of the front air bag door portion 74 is disposed along the parting line 70. Furthermore, a rear air bag door portion 75 is substantially opposed to a rear portion of the air bag device 30, and a front end (free end) of the rear air bag door portion 75 is disposed along the parting line 70.

Figure 16:
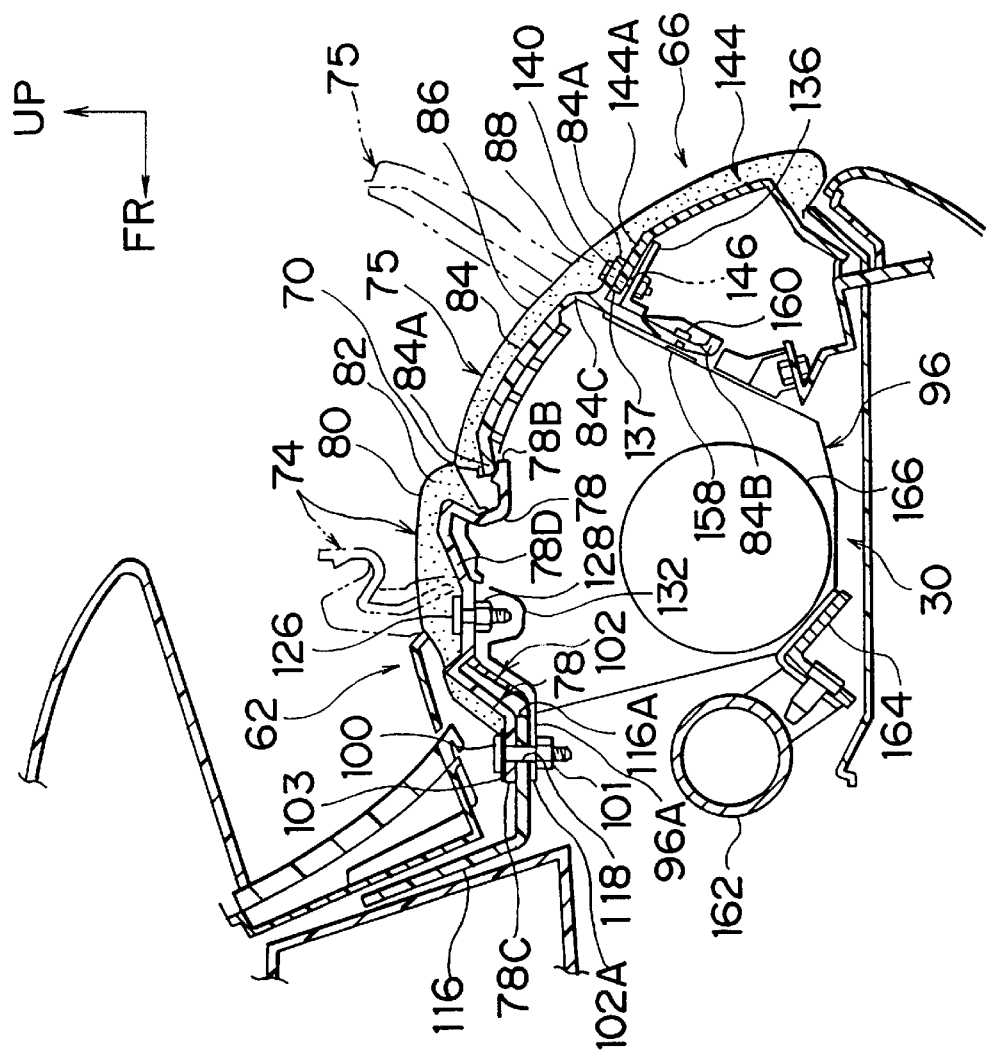
FIG. 16 is an enlarged cross-sectional view taken along line XVI—XVI in FIG. 15.

As shown in FIG. 16, the front panel 62 is of an integrally foamed type, and the front air bag door portion 74 is equipped with a base 78 as a base of the front air bag door portion, a skin 80 and a foamed layer 82 disposed between the base 78 and the skin 80. The passenger-side rear panel 66 is also of an integrally foamed type, and the rear air bag door portion 75 is equipped with a base 84 as a base of the rear air bag door portion, a skin 86 and a foamed layer 88 disposed between the base 84 and the skin 86.

Figure 17:
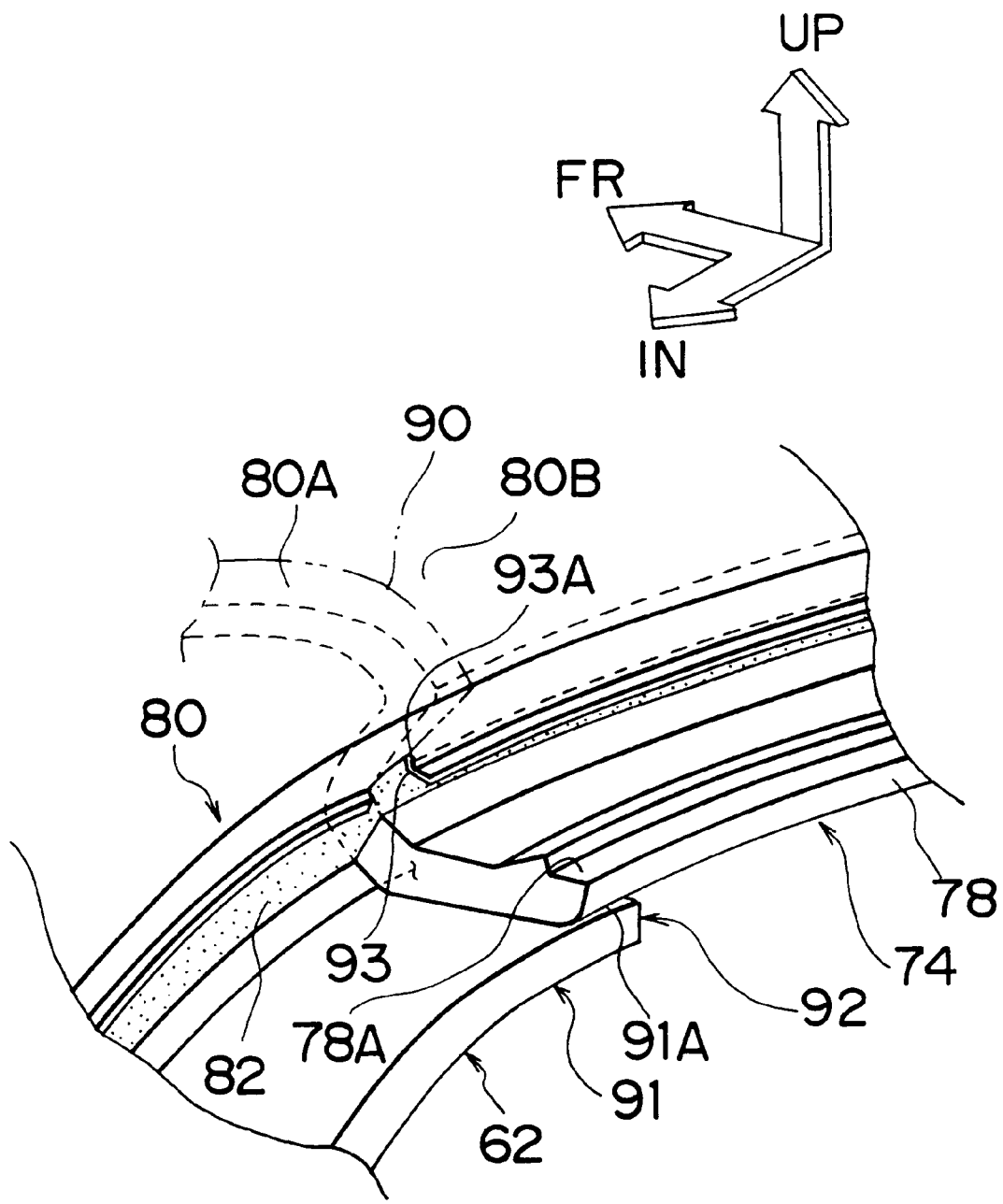
FIG. 17 is an enlarged partial perspective view partially showing an instrument panel integrally equipped with an air bag door portion according to a second embodiment of the present invention, as viewed from a location diagonally rearward of a vehicle.
Figure 18:
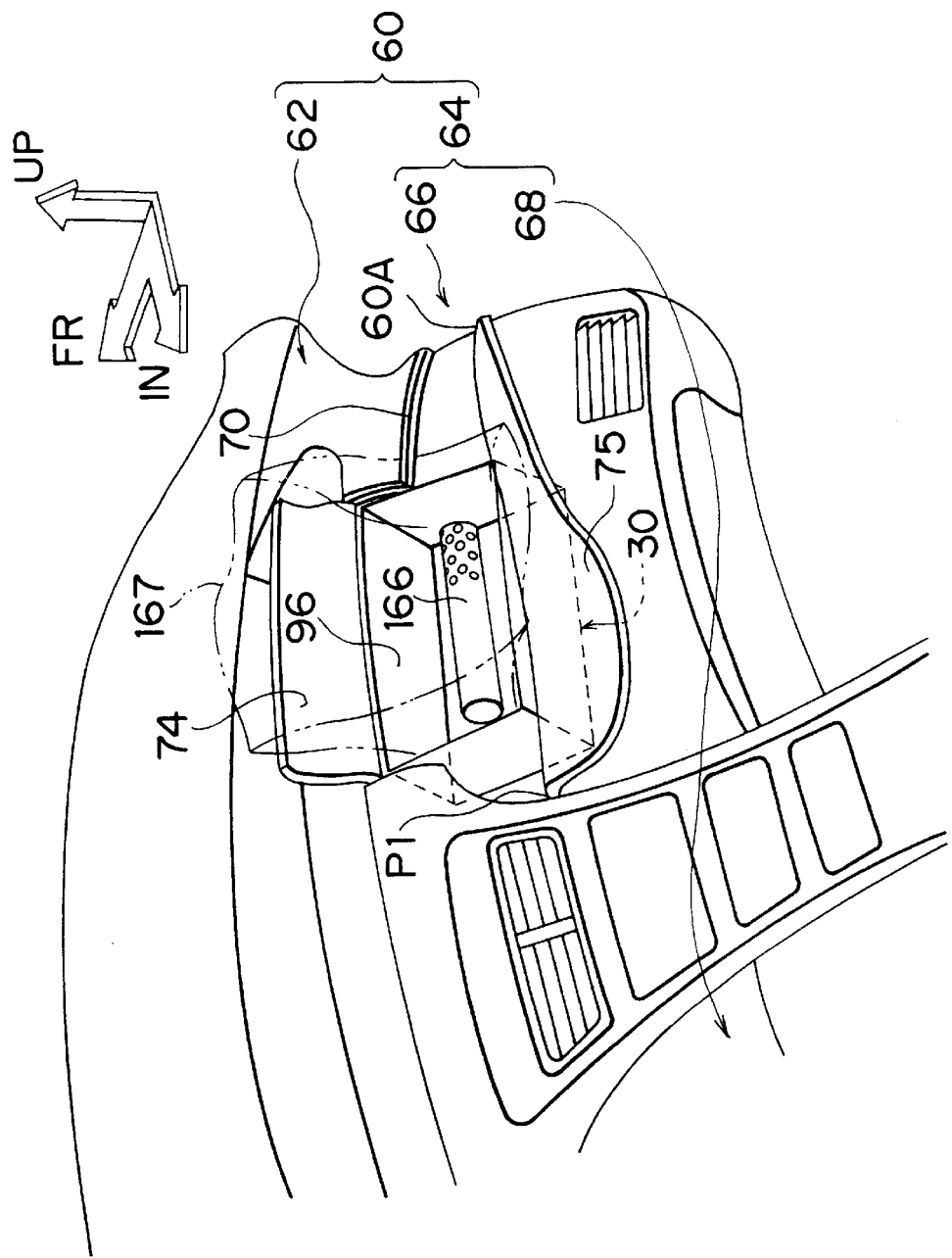
FIG. 18 is a partial perspective view showing an open state of the air bag door portion that is integrated with the instrument panel according to the second embodiment of the present invention, as viewed from a location diagonally rearward of the vehicle.

As shown in FIG. 17, a side tear line 90 is formed so as to extend along the fore-to-aft direction at each of the vehicle lateral end portions of the front air bag door portion 74. Furthermore, an opening 92 for deployment of the air bag body is formed from rearwards in a base 91 of the front panel 62. The opening 92 is closed by the base 78 of the front air bag door portion. Left and right end portions 78A (the right end portion is not shown) of the base 78 of the front air bag door portion 74 are superimposed on left and right upper faces 91A (the right upper face is not shown) on an outer periphery portion of the opening 92 formed in the base 91 respectively. The side tear lines 90 of the front air bag door portion 74, which are formed in a back face of the skin 80 (a face adjacent to the foamed layer 82), are invisible from the inside of the passenger compartment.

The foamed layer 82 and the skin 80 are disposed on upper portions of the base 91 of the front panel 62 and the base 78 of the front air bag door portion 74 respectively. A notch 93, which is V-shaped in a front view, is formed in a rear edge portion of the skin 80. A top portion 93A of the notch 93 is coupled to a rear end portion of the side tear line 90. When the front air bag door portion 74 is deployed, the skin 80 is cloven along the side tear line 90, with the notch 93 serving as a starting point of cleavage.

As shown in FIG. 16, an engagement portion 78B is formed on a rear edge portion of the base 78. A front edge portion 84A of the base 84 of the rear air bag door portion abuts on an upper face of the engagement portion 78B.

Figure 19:
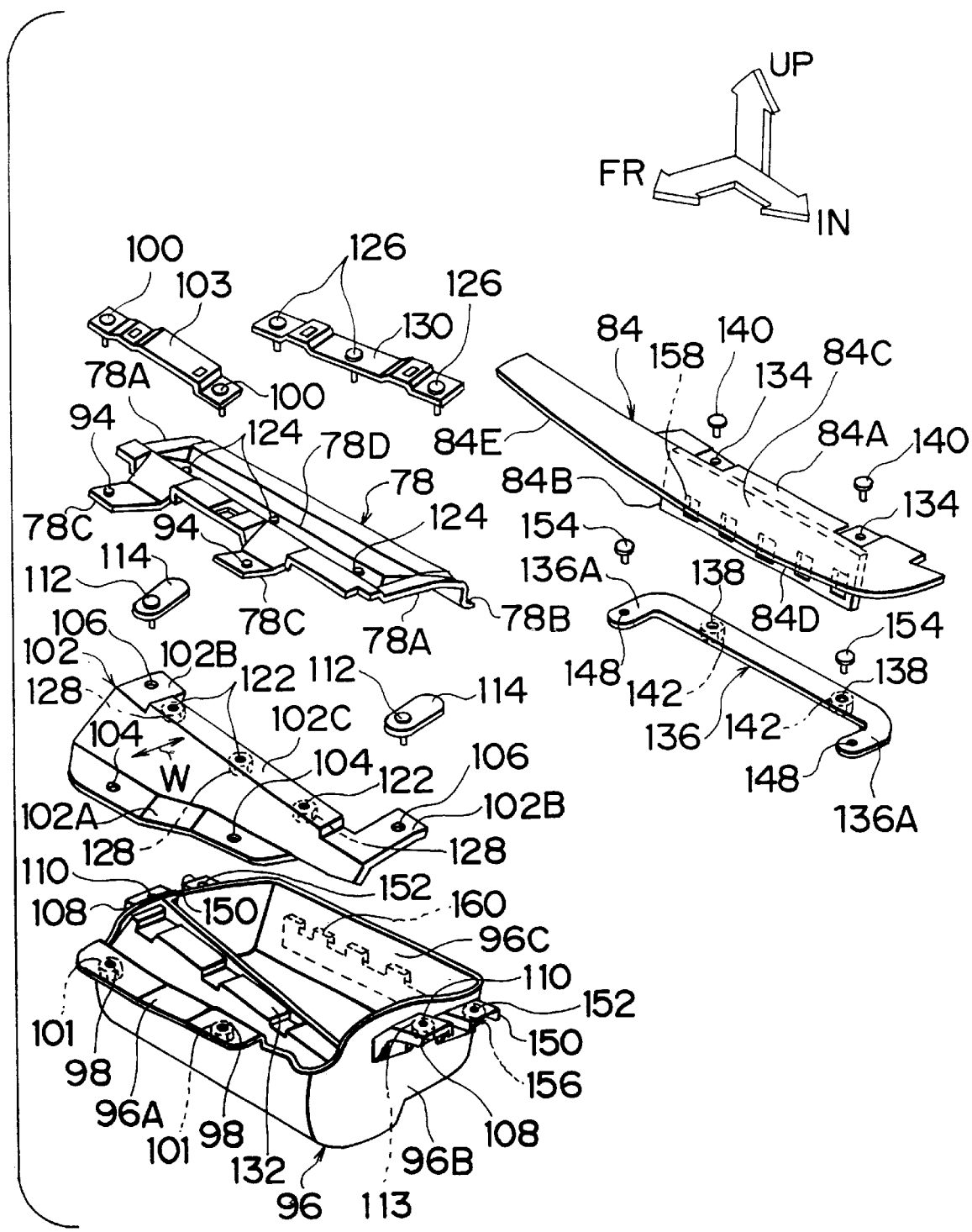
FIG. 19 is an exploded perspective view showing essential parts of the instrument panel integrally equipped with the air bag door portion according to the second embodiment of the present invention, as viewed from a location diagonally forward of the vehicle.

As shown in FIG. 19, the base 78 of the front air bag door portion has a pair of left and right mounting portions 78C protruding from a front end portion of the base 78. Through-holes 94 are formed through these mounting portions 78C. An air bag case 96 is in the shape of a box with an open top, and a mounting flange 96A is formed so as to extend forward from a front upper end of the air bag case 96. A pair of left and right through-holes 98 are formed through the mounting flange 96A. Weld bolts 100 are inserted from above into the through-holes 94 of the base 78 of the front air bag door portion 74 and the through-holes 98 of the air bag case 96. Nuts 101 are screwed into these weld bolts 100 from a lower face side of the mounting flange 96A. The left and right weld bolts 100 are disposed close to respective end portions of a keep plate 103 that is in the shape of a long straight-edged strip.

As shown in FIG. 16, a front edge portion 102A of a reinforcing plate 102 is sandwiched between the mounting portion 78C of the base 78 and the mounting flange 96A of the air bag case 96. A rear edge portion 116A of a base 116 of the front panel 62 is sandwiched between the mounting portion 78C of the base 78 and the front edge portion 102A of the reinforcing plate 102, and the weld bolt 100 is passed through a through-hole 118 formed through the base 116.

As shown in FIG. 19, a pair of left and right through-holes 104 are formed through the front edge portion 102A of the reinforcing plate 102, and the weld bolts 100 are passed through these through-holes 104. The reinforcing plate 102 covers a front portion of an opening of the air bag case 96. The reinforcing plate 102 in the fore-to-aft direction (in the direction indicated by an arrow W) becomes wider toward the outside in the vehicle lateral direction.

Mounting portions 102B are formed so as to protrude rearwards from respective vehicle lateral end portions of the reinforcing plate 102, and through-holes 106 are formed through these mounting portions 102B. Mounting brackets 108 are fixed to left and right lateral wall portions 96B of the air bag case 96 respectively, and through-holes 110 are formed through these mounting brackets 108. Weld bolts 112 are inserted from above into the through-holes 106 of the reinforcing plate 102 and the through-holes 110 of the mounting bracket 108. Nuts 112 are screwed into these weld bolts 112 from a lower face side of the mounting bracket 108. The left and right weld bolts 112 are attached to respective keep plates 114 that extend rearwards. An unshown rear edge portion of the base of the front panel is sandwiched between the mounting portion 102B of the reinforcing plate 102 and the keep plate 114, and the weld bolt 112 is passed through a through-hole formed through that base.

Through-holes 122 are formed at predetermined intervals through a vehicle lateral center portion of a rear edge portion 102C of the reinforcing plate 102. Through-holes 124 are formed through the base 78 at locations opposed to those through-holes 122, respectively. Weld bolts 126, which serve as one type of fastening means, are inserted from above into the through-holes 122 of the reinforcing plate 102 and the through-holes 124 of the base 78. Nuts 128, which serve as another type of fastening means, are screwed into these weld bolts 126 from a lower face side of the rear edge portion 102C of the reinforcing plate 102. These weld bolts 126 are disposed respectively at two end portions and a center portion of a keep plate 130 that is in the shape of a long straight-edged strip.

Accordingly, the base 78 of the front air bag door portion 74 is deployed upwards, with a portion slightly behind a location opposed to the rear edge portion 102 of the reinforcing plate 102 serving as a hinge portion 78D. The base 78 then assumes a deployment state as indicated by an alternate long and two short dashes line in FIG. 16. A protection plate 132 is disposed below a portion of the reinforcing plate 102 that is located inside the air bag case 96. When the air bag body is deployed, the protection plate 132 prevents the hinge portion of the front air bag door portion 74 from being damaged due to an expansion force of the air bag body. The protection plate 132 also prevents the nuts 128 from dropping. A front edge portion of the protection plate 132 is supported by a front end upper portion of the air bag case 96.

As shown in FIG. 19, a pair of left and right through-holes 134 are formed through the rear edge portion 84A of the base 84 of the rear air bag door portion, and an auxiliary plate 136 that extends in the vehicle lateral direction is disposed below the rear edge portion 84A of the base 84. A pair of left and right through-holes 138 are formed through the auxiliary plate 136. Bolts 140 are inserted from above into the through-holes 134 of the base 84 of the rear air bag door portion and the through-holes 138 of the auxiliary plate 136. Nuts 142 are screwed into these bolts 140 from a lower face side of the auxiliary plate 136.

As shown in FIG. 16, an opening 137 for deployment of the air bag body is formed through a base 144 of the passenger-side rear panel 66 from a front side thereof. The opening 137 is closed by the base 84 of the rear air bag door portion. A front edge portion 144A of the base 144 of the passenger-side rear panel 66 is sandwiched between the rear edge portion 84A of the base 84 and the reinforcing plate 136. The bolts 144 are passed through through-holes 146 formed through the base 144. The bolts 140 are prevented from rotating relative to the base 144 by predetermined rotation-preventing means.

As shown in FIG. 19, mounting portions 136A are formed so as to extend forward from left and right end portions of the reinforcing plate 136, and through-holes 148 are formed through those mounting portions 136A. Behind the mounting brackets 108, mounting brackets 150 are attached to the left and right lateral wall portions 96B of the air bag case 96 respectively. Through-holes 152 are formed through those mounting brackets 150. Bolts 154 are inserted from above into the through-holes 148 of the reinforcing plate 136 and the through-holes 152 of the mounting brackets 150. Nuts 156 are screwed into those bolts 154 from a lower face side of the mounting brackets 150. The bolts 154 are unrotatably fixed to an unshown base of the passenger-side rear panel. The rear edge portion of the base of the front panel is sandwiched between the mounting portions 136A of the reinforcing plate 136 and the mounting brackets 150.

A longitudinal wall portion 84B is formed so as to extend downward at a location close to the rear end of the base 84 of the rear air bag door portion. A plurality of engagement holes 158 are formed through the longitudinal wall portion 84B along the vehicle lateral direction. Engagement pawls 160 that are fixed to a rear wall portion 96C of the air bag case 96 are in engagement with those engagement holes 158.

Accordingly, the base 84 of the rear air bag door portion is deployed upwardly, with a portion located close to a front upper end of the longitudinal wall portion 84B serving as a hinge portion 84C. The rear air bag door portion 75 then assumes a deployment state as indicated by an alternate long and two short dashes line in FIG. 16.

As shown in FIG. 15, the free end (front end) 84D of the base 84 of the rear air bag door portion is set wider than the air bag case 96. An extension portion 84E is formed so as to extend outwards in the vehicle lateral direction from a vehicle lateral outside portion of the free end (front end) 84D of the base 84. The rear air bag door portion 75 is designed to reach a point P1 where an extended line of a hinge line T of the base 84 intersects with the parting line 70 and to reach a vehicle lateral outside end portion of the passenger-side rear panel 66 (a vehicle lateral outside end portion 60A of the instrument panel 60). Furthermore, a logo accompanied by an underline such as "SRS AIRBAG" is printed substantially on the hinge line T on a design surface of the skin 80, whereby the hinge line T is indicated.

As shown in FIG. 16, the air bag case 96 of the air bag device 30 is fixed to an instrument panel reinforcement 162 through a bracket 164. A cylindrical inflator 166 is disposed on a bottom portion of the air bag case 96 along the vehicle lateral direction. An unshown air bag body is accommodated in a folded state in a portion close to the opening of the air bag case 96. As indicated by a long and two dashes line in FIG. 18, an air bag body 167 is expanded and deployed due to a gas ejected from the inflator 166, whereby the front air bag door portion 74 and the rear air bag door portion 75 are pushed toward the inside of the passenger compartment.

The operation of the present embodiment will now be described.

In the present embodiment, the parting line 70 in the shape of a forward-swelling arcuate curve is formed so as to separate the front panel 62 from the passenger-side rear panel 66. The free end (front end) 84D of the base 84 of the rear air bag door portion is set wider than the air bag case 96.

The rear air bag door portion 75 is designed to reach the point P1 where the extended line T of the hinge line of the base 84 intersects with the parting line 70 and to reach the vehicle lateral outside end portion of the passenger-side rear panel 66 (the vehicle lateral outside end portion 60A of the instrument panel 60).

Consequently, when the air bag body 167 is expanded and deployed, there is no need to break the skin along the border between the front panel 62 and the passenger-side rear panel 66. Furthermore, the rear air bag door portion 75 can be deployed without breaking the skin 86 at all. Therefore, it is possible to reduce restrictions on designing freedom resulting from the break line and the parting line 70 that are defined by the front air bag door portion 74 and the rear air bag door portion 75, and to inhibit the outward appearance from deteriorating. In addition, since the rear air bag door portion 75 can be deployed without breaking the skin at all, it is possible to smoothly deploy the air bag body and to increase an angle of deployment.

In the present embodiment, the protection plate 132 is disposed below the portion of the reinforcing plate 102 that is located inside the air bag case 96. Thus, the protection plate 132 can prevent the hinge portion of the front air bag door portion 74 from being damaged due to an expansion force of the air bag body. Also, the protection plate 132 can prevent the nuts 128 from dropping. In addition, when the air bag body is deployed, the protection plate 132 can prevent the air bag body from interfering with a lower face portion of the reinforcing plate 102.

In the present embodiment, since the left and right side tear lines 90 of the front air bag door portion 74 are invisible, there is little restriction on designing freedom imposed on the front air bag door portion 74, and an attractive outward appearance is achieved. It is also possible to employ a construction wherein the side lines 90 of the front air bag door portion 74 are visible.

An instrument panel integrally equipped with an air bag door portion according to a third embodiment of the present invention will now be described with reference to FIGS. 20 and 21.

Like components are denoted by like reference numerals in both the second and third embodiments, and those components already described in relation to the second embodiment will not be described again below.

As shown in FIG. 20, in the present embodiment, a retainer 170, which acts as a skin holder, is disposed on a skin 91 for the front panel 62. A lower portion 170A of the retainer 170 is fixed to the base 91 through a fastening member 172 such as a rivet or the like. A plurality of engagement pawls 174 are formed on a front face of an upper portion 170B of the retainer 170. These engagement pawls 174 are in engagement with a rear end portion of a door-portion outside section 80A that extends along the side tear line 90 of the skin. In other words, the skin 80 is retained by the base 91 of the front panel 62 through the retainer 170.

Consequently, when the skin 80 is cloven along the side tear line 90 in response to the deployment of the front air bag door portion 74, with the notch 93 serving as a starting point of cleavage, a door portion-side section 80A of the skin 80 that extends along the side tear line 90 is prevented from being turned up.

In addition, in the present embodiment, door-side retainers 176, which act as door-side skin holders, are disposed on left and right end portions 78A of the rear edge portion of the base 78 of the front air bag door portion 74A. The door-side retainers 176 are disposed on the left and right end portions 78A of the rear edge portion of the base 78 of the front air bag door portion 74.

Figure 21:
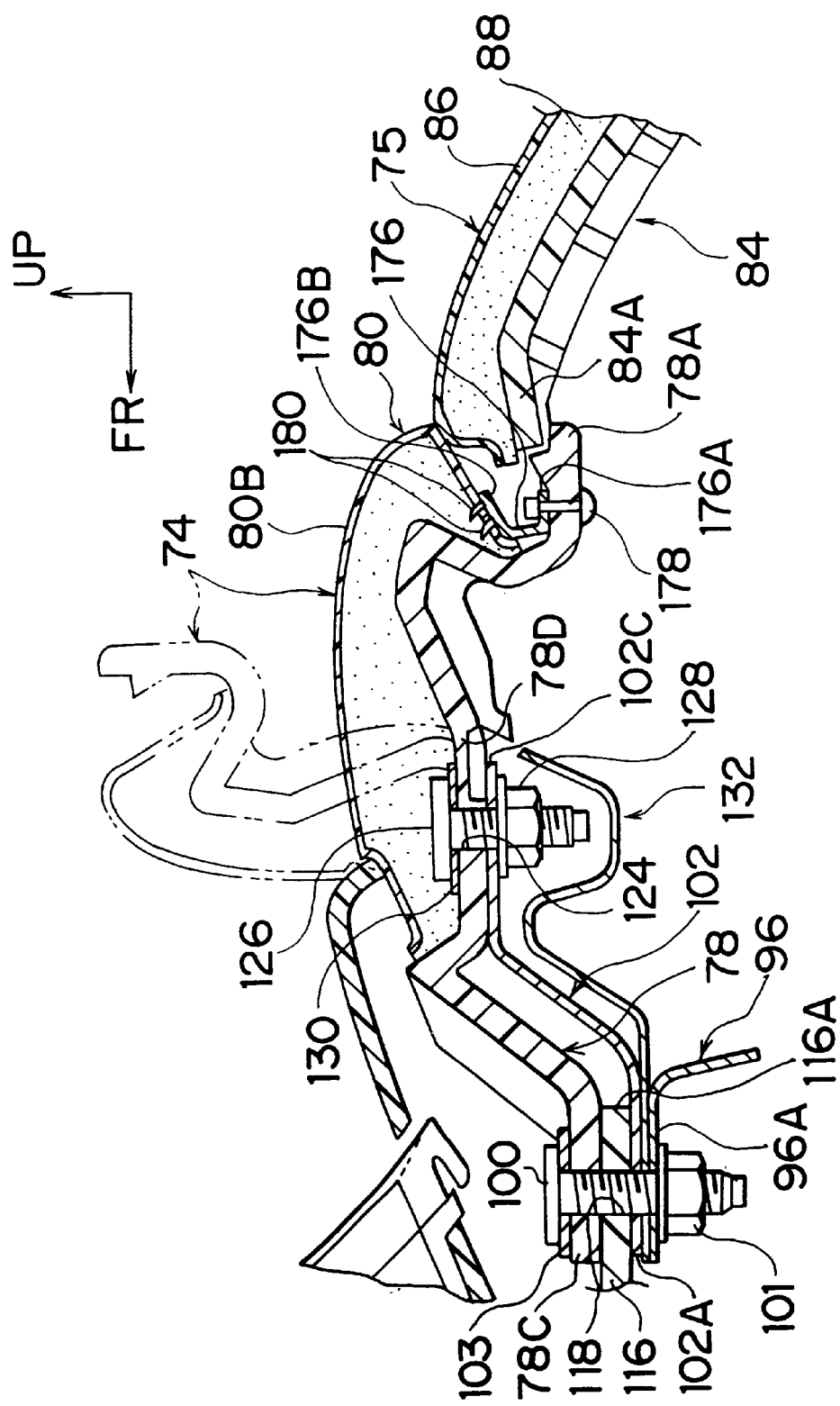
FIG. 21 is an enlarged partial cross-sectional view taken along line XXI—XXI in FIG. 20.

As shown in FIG. 21, a lower portion 176A of the door-side retainer 176 is fixed to the base 78 through a fastening member 178 such as a rivet or the like. A plurality of engagement pawls 180 are formed on a front face of an upper portion 176B of the door-side retainer 176. These engagement pawls 180 are in engagement with a door portion-side section 80B that extends along the side tear line 90 of the skin 80 of the front air bag door portion. In other words, the skin 80 is retained by the base 78 of the front air bag door portion 74 through the door-side retainer 176.

Consequently, the door portion-side section 80B of the skin 80 that extends along the side tear line 90 is prevented from being turned up in response to deployment of the front air bag door portion 74.

The operation of the present embodiment will now be described.

In the present embodiment, the rear end portion of the door-portion outside section 80A of the skin 80 that extends along the side tear line 90 is retained by the base 91 of the front panel 62 through the retainer 170. Accordingly, when the skin 80 is cloven along the side tear line 90 in response to the deployment of the front air bag door portion 74, with the notch 93 serving as a starting point of cleavage, the door-portion outside section 80A of the skin 80 that extends along the side tear line 90 is prevented from being turned up from the base 91 of the front panel 62.

Furthermore, in the present embodiment, the rear end portion of the door portion-side section 80B of the skin 80 that extends along the side tear line 90 is retained by the base 78 of the front air bag door portion 74 through the door-side retainer 176. Hence, when the skin 80 is cloven along the side tear line 90 in response to the deployment of the front air bag door portion 74, with the notch 93 serving as a starting point of cleavage, the door-portion inside section 80B of the skin 80 that extends along the side tear line 90 is also prevented from being turned up from the base 78 of the front air bag door portion.

Accordingly, it is possible to break the skin 80 more reliably along the side tear line 90 in response to the deployment of the front air bag door portion 74.

Although the present embodiment employs the door-side retainers 176, it is also possible to adopt a construction that dispenses with the door-side retainers 176.

Figure 22:
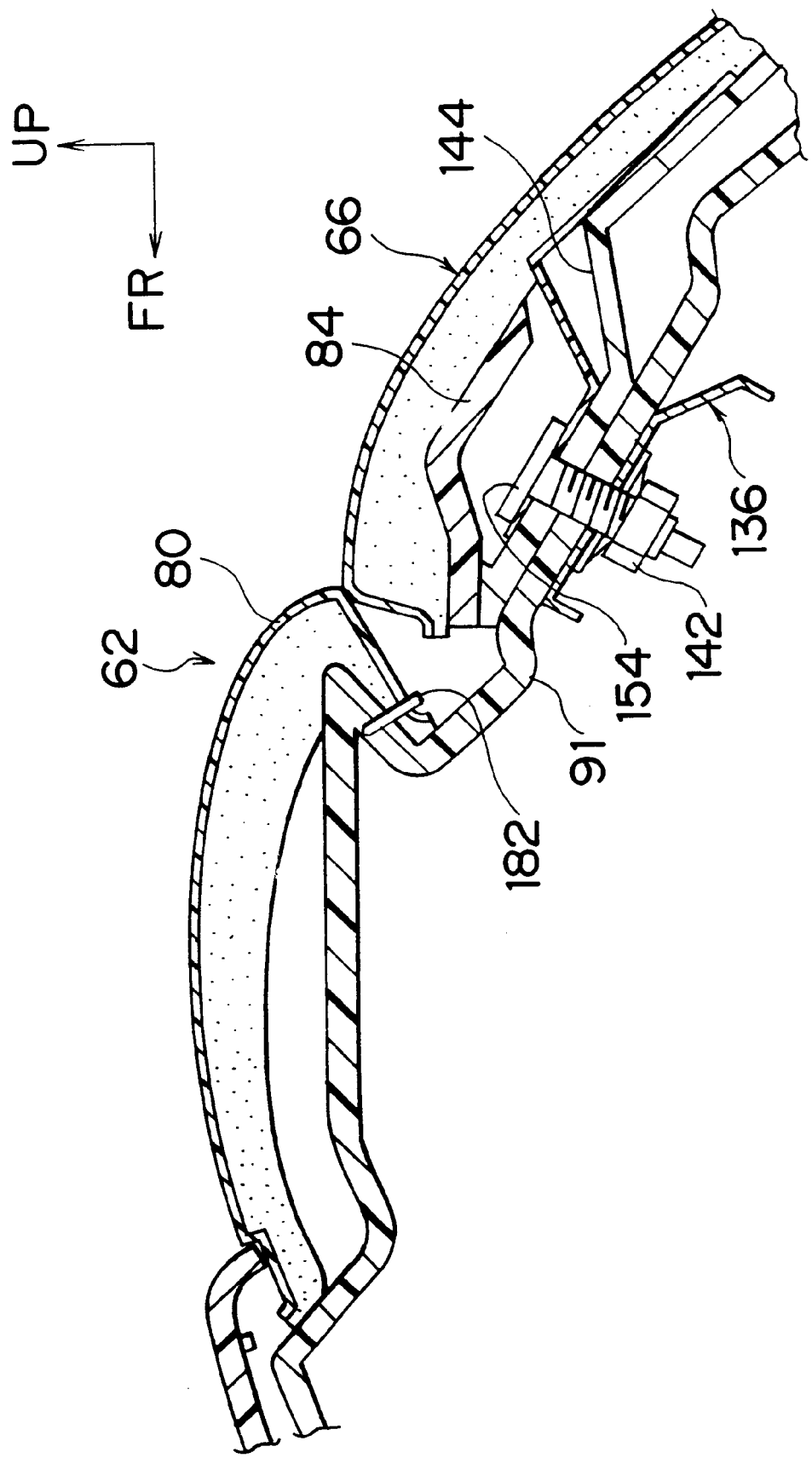
FIG. 22 is an enlarged partial cross-sectional view taken along a line corresponding to line XXII—XXII in FIG. 20, showing the instrument panel integrally equipped with the air bag door portion according to the third embodiment of the present invention.
Figure 23:
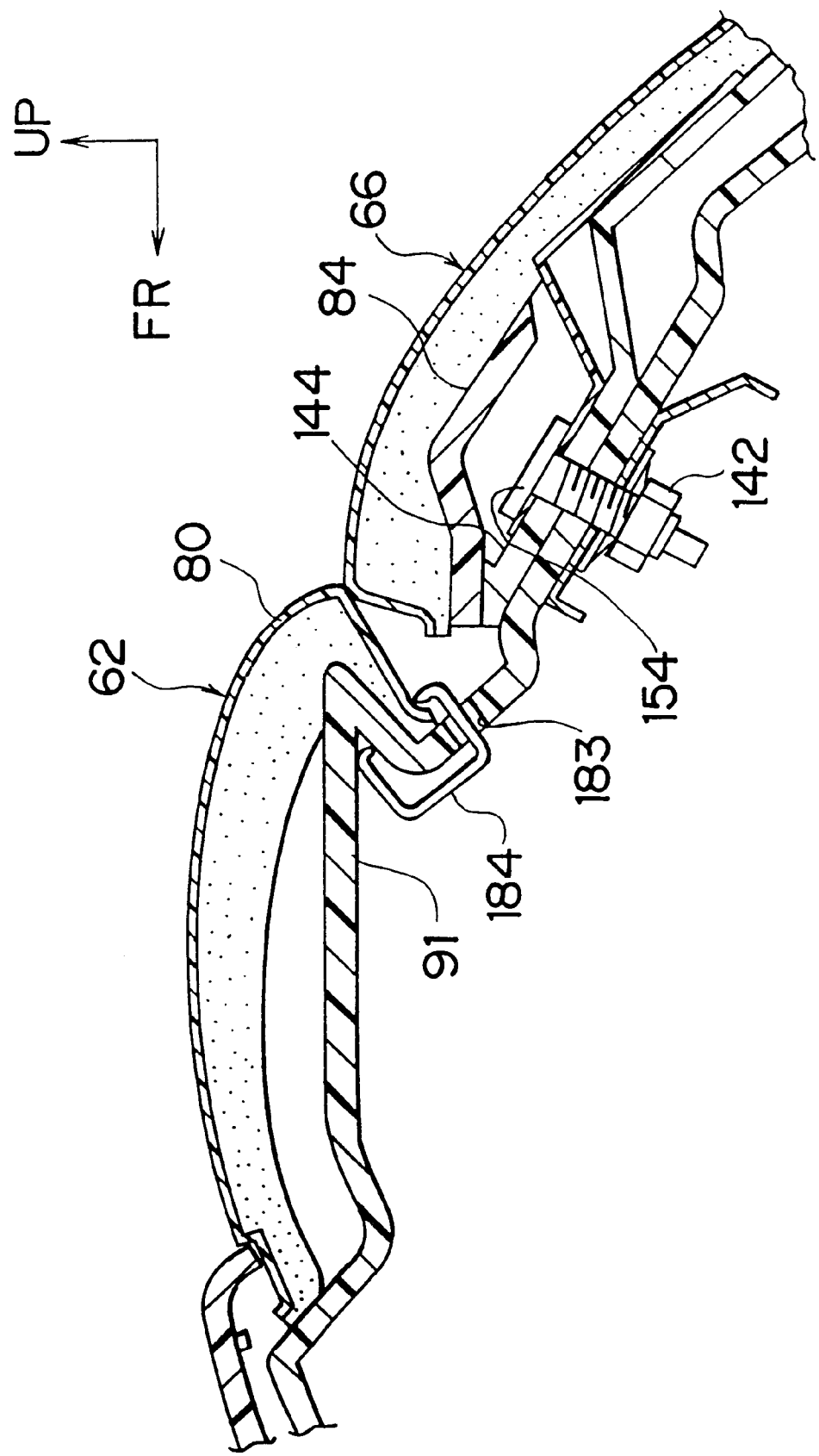
FIG. 23 is an enlarged partial cross-sectional view taken along a line corresponding to line XXII—XXII in FIG. 20, showing the instrument panel integrally equipped with the air bag door portion according to another variation of the third embodiment of the present invention.

The present embodiment employs the retainer 170, which acts as a skin holder, and the door-side retainers 176, which act as door-side skin holders. However, instead of using these retainers, it is also possible, as shown in FIG. 22, to employ a construction wherein the skin 80 is fixed to the base by using metal needles such as staples 182 or the like as skin holders and door-side skin holders. As shown in FIG. 23, it is also possible to employ a construction wherein with the aid of a through-hole 183 formed through the base, the skin 80 and the base are clamped together by a clamping member 184 such as a clip, which serves as a skin holder and door-side skin holder.

Figure 24:
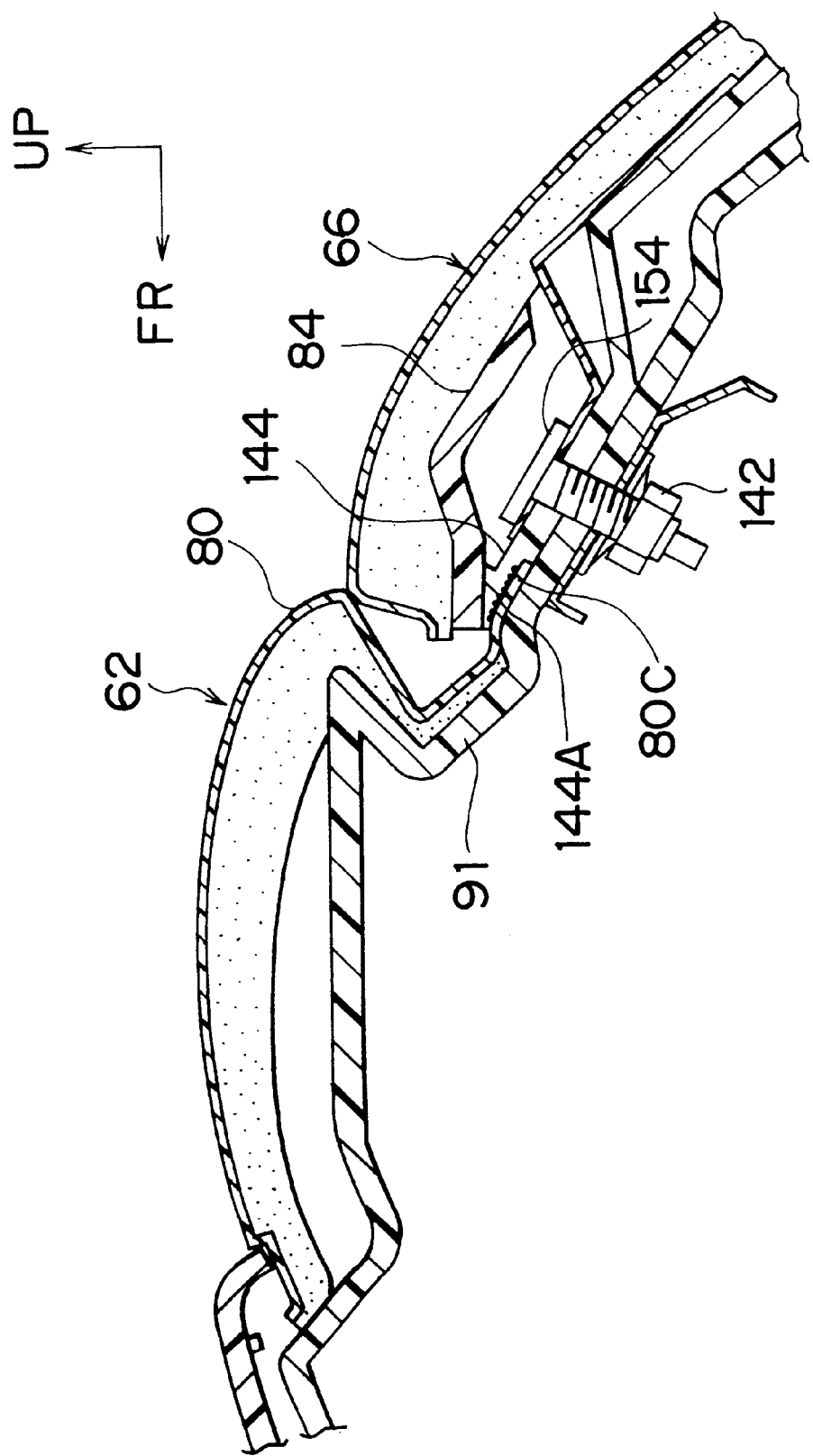
FIG. 24 is an enlarged partial cross-sectional view taken along a line corresponding to line XXII—XXII in FIG. 20, showing the instrument panel integrally equipped with the air bag door portion according to another variation of the third embodiment of the present invention.

As shown in FIG. 24, it is also possible to employ a construction wherein the skin 80 is extended along the base 91 and a leading end portion 80C of the skin 80 is sandwiched between the base 91 and another member such as the base 144 of the passenger-side rear panel 66 or the like. Furthermore, a pawl 144A may be provided on a section of the base 144 that sandwiches the leading end portion 80C of the skin 80 so as to prevent the skin 80 from falling off.

An instrument panel integrally equipped with an air bag door portion according to a fourth embodiment of the present invention will now be described in detail with reference to FIG. 25.

Like components are denoted by like reference numerals in both the second and fourth embodiments, and those components already described in relation to the second embodiment will not be described again below.

Figure 25:
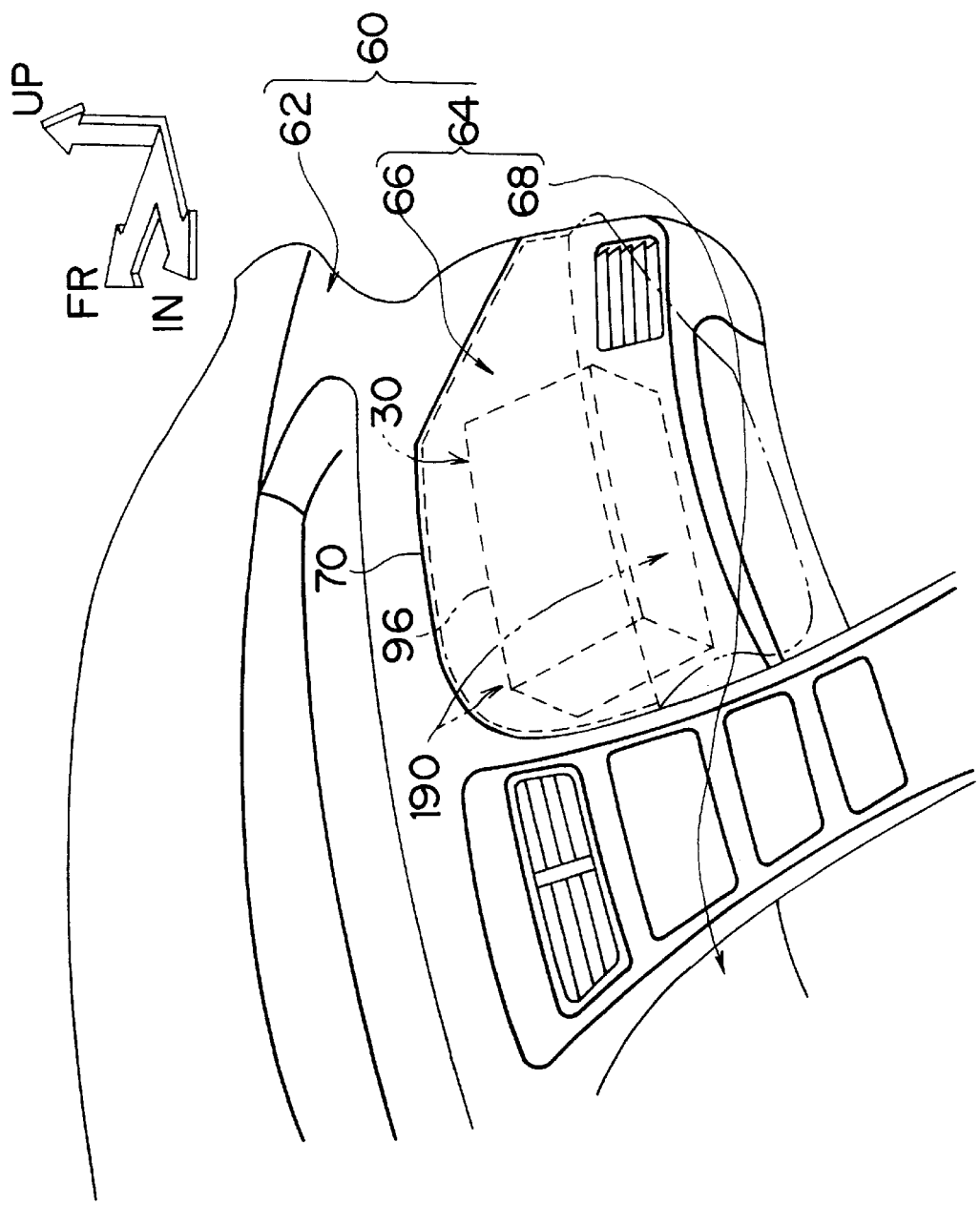
FIG. 25 is a partial perspective view showing a passenger-side portion of an instrument panel integrally equipped with an air beg door portion according to a fourth embodiment of the present invention, as viewed from a location diagonally rearward of a vehicle.

As shown in FIG. 25, the present embodiment dispenses with the front air bag door portion 74 of the second embodiment. That is, a single air bag door portion 190 that is enlarged in a forward direction is disposed at a location opposed to the air bag device 30. A rear end of the air bag door portion 190 is fixed to the base of the passenger-side rear panel 66. The air bag door portion 190 is designed to be deployed toward a rear part of the vehicle. Furthermore, a front end (free end) of the air bag door portion 190 is disposed along the parting line 70 that separates the front panel 62 from the passenger-side rear panel 66.

Accordingly, the present embodiment is also able to make the contour of the air bag door portion 190 invisible, whereby there is little restriction imposed on design surfaces and an attractive outward appearance is achieved.

An instrument panel integrally equipped with an air bag door portion according to a fifth embodiment of the present invention will now be described in detail with reference to FIG. 26.

Like components are denoted by like reference numerals in both the second and fifth embodiments, and those components already described in relation to the second embodiment will not be described again below.

Figure 26:
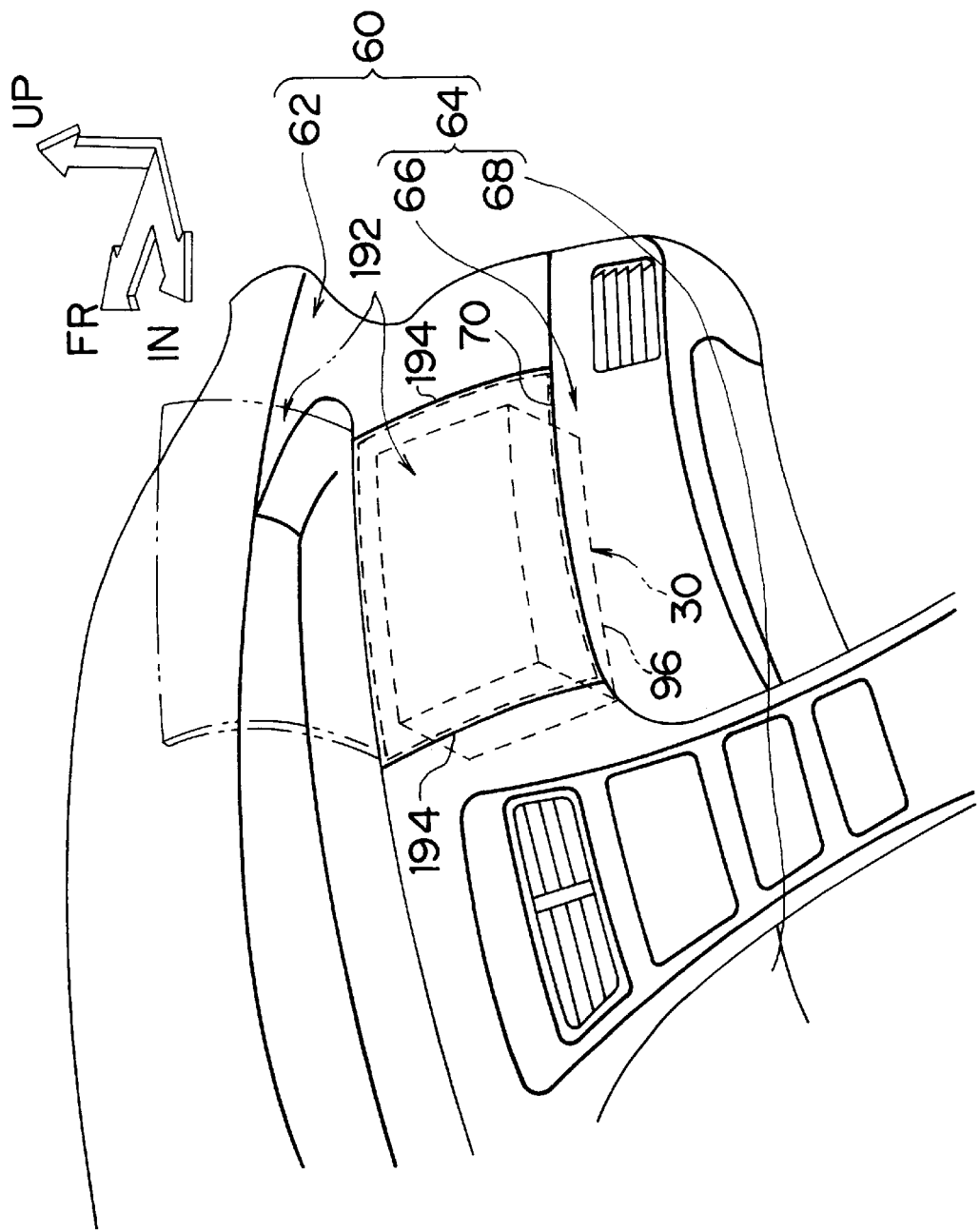
FIG. 26 is a partial perspective view showing a passenger-side portion of an instrument panel integrally equipped with an air bag door portion according to a fifth embodiment of the present invention, as viewed from a location diagonally rearward of a vehicle.

As shown in FIG. 26, the present embodiment dispenses with the rear air bag door portion 75 of the second embodiment. That is, a single air bag door portion 192 that is enlarged rearwards is disposed at a location opposed to the air bag device 30. A front end of the air bag door portion 192 is fixed to the base of the front panel 62. The air bag door portion 192 is designed to be deployed toward a front part of the vehicle. Furthermore, a rear end (free end) of the air bag door portion 192 is disposed along the parting line 70 that separates the front panel 62 from the passenger-side rear panel 66.

Accordingly, the present embodiment is also able to make the contour of the air bag door portion 190 invisible by making side tear lines 194 of the air bag door portion 192 invisible. Consequently, there is little restriction imposed on design surfaces and an attractive outward appearance is achieved.

An instrument panel integrally equipped with an air bag door portion according to a sixth embodiment of the present invention will now be described in detail with reference to FIG. 27.

Figure 27:
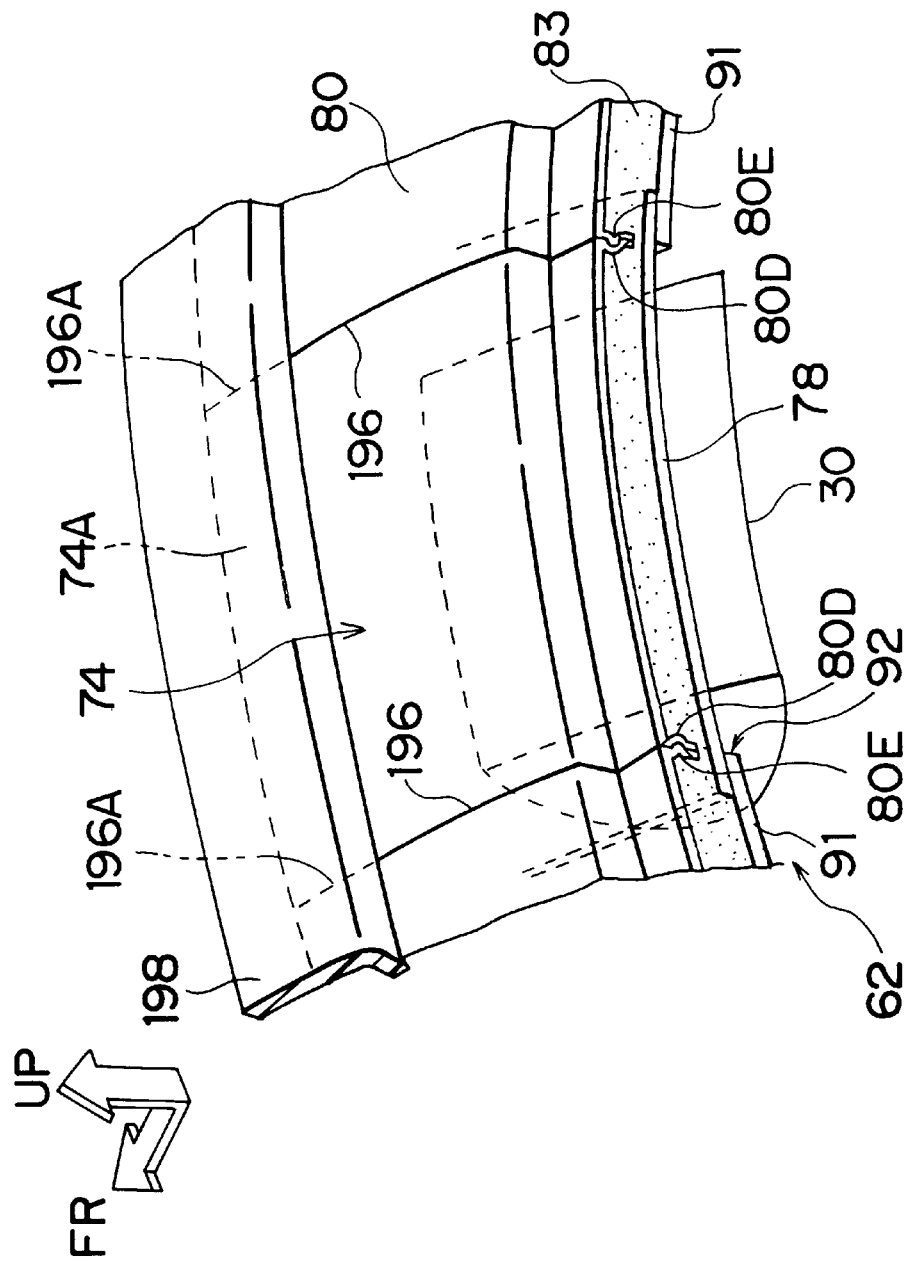
FIG. 27 is a partial perspective view showing a cross section of a passenger-side portion of an instrument panel integrally equipped with an air bag door portion according to a sixth embodiment of the present invention, as viewed from a location diagonally rearward of a vehicle.
Figure 28:
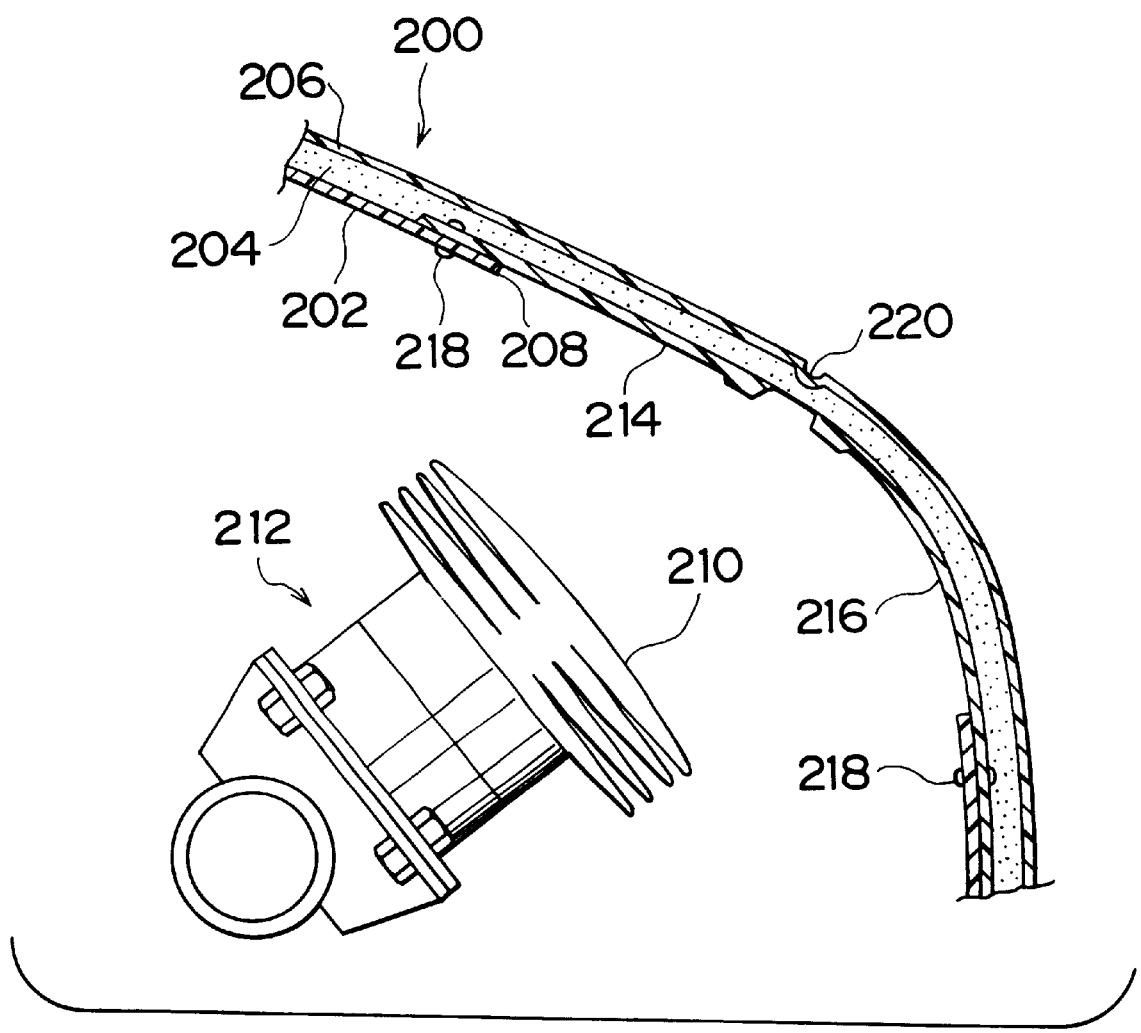
FIG. 28 is a partial side sectional view schematically showing an instrument panel integrally equipped with an air bag door portion.

As shown in FIG. 27, in the present embodiment, side tear lines 196 that extend in the fore-to-aft direction of the vehicle along the left and right ends of the front air bag door portion 74 are the only side tear lines formed in the skin 80. Front end portions 196A of these side tear lines 196 and the front end portion 74A of the front air bag door portion 74 are covered from the inside of the passenger compartment with a trim strip or garnish 198, which is in the shape of a long straight-edged strip and disposed along the vehicle lateral direction.

The side tear lines 196 are of what is called a fastener type, wherein an end portion 80D of the skin 80 on the side of the front air bag door portion 74 and an end portion 80E of the skin 80 on the side of the body portion, which are preliminarily separated from each other, come into engagement with each other.

Accordingly, in the present embodiment, the front end portions 196A of the side tear lines 196 are hidden behind the garnish 198 and thus not exposed to the design surface. Consequently, the side tear lines 196 are hardly exposed to the design surface, so that the overall quality of the outward appearance can be enhanced with ease. In other words, the front end portions 196A of the side tear lines 196 that are hidden behind the garnish 198 do not require a high degree of dimensional accuracy, whereby the designing and manufacturing processes become easy to implement.

In the present embodiment, there has been described a construction wherein the side tear lines 196 that extend in the fore-to-aft direction of the vehicle along the left and right ends of the front air bag door portion 74 are the only side tear lines. However, instead of such a construction, as is apparent from the first embodiment of the present invention (See FIG. 2), it is also possible to employ a construction wherein a garnish disposed along the vehicle lateral direction covers an upper end portion of the tear line 32, which is formed substantially in the shape of a U in a planar view.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An instrument panel integrally equipped with an air bag door portion, wherein the instrument panel is divided by a parting line into an upper instrument panel with a base and a separate distinct lower instrument panel with a base, comprising:

an upper air bag door portion having a base and closing an opening for deployment of an air bag body, which opening is formed in the base of said upper instrument panel; and a lower air bag door portion having a base and closing an opening for deployment of the air bag body, which opening is formed in the base of said lower instrument panel;

wherein the lower air bag door portion is closer to a passenger than the upper air bag door portion;

wherein one end of the base of said upper air bag door portion and one end of the base of said lower air bag door portion are fixed to the base of said upper instrument panel and the base of said lower instrument panel respectively, and the other end of the base of said upper air bag door portion and the other end of the base of said lower air bag door portion are free and disposed along the parting line that separates said upper instrument panel from said lower instrument panel;

wherein at least the free end of the base of said lower air bag door portion is wider than an air bag case located adjacent the upper and lower air bag door portions; and wherein the lower instrument panel and the lower air bag door portion are entirely covered with a single skin.

2. The instrument panel according to claim 1, wherein said upper instrument panel is provided with a skin and the skin has a side tear line at a location substantially opposed to vehicle lateral opposed ends of the base of said upper air bag door portion, said side tear line extending in a direction in which the upper air bag door portion is cloven during deployment thereof.

3. The instrument panel according to claim 2, wherein a fragile portion is formed at an end portion of said skin on the upper instrument panel and on an elongation of said side tear line, said fragile portion serving as a starting point of cleavage when the upper air bag door portion is deployed.

4. The instrument panel according to claim 2, wherein said upper instrument panel has skin holding means for holding the skin that is outside said upper air bag door portion and adjacent to said side tear line onto the base of said upper instrument panel.

5. The instrument panel according to claim 4, wherein said upper instrument panel has door-side skin holding means for holding the upper air bag door portion skin adjacent to said side tear line onto the base of said upper air bag door portion.

6. The instrument panel according to claim 2, wherein said side tear line is invisible.

7. The instrument panel according to claim 2, further comprising a garnish extending in a vehicle lateral direction so as to cover an upper end portion of said upper air bag door portion and an upper end portion of the side tear line from an inside of a passenger compartment.

8. The instrument panel according to claim 1, wherein the base of the upper air bag door portion has a hinge portion, and further comprising:
 a fastening member for fastening the hinge portion of the base of said upper air bag door portion to a side of an air bag case; and
 a protection plate for covering said fastening member from a location below and adjacent to said fastening member.

9. An instrument panel integrally equipped with an air bag door portion, wherein the instrument panel is divided by a parting line into a first instrument panel with a base and a separate distinct second instrument panel with a base, the parting line being approximately parallel with the vehicle lateral direction, comprising:
 a first air bag door portion having a base and closing an opening for deployment of an air bag body, which opening is formed in the base of said first instrument panel; and
 a second air bag door portion having a base and closing an opening for deployment of the air bag body, which opening is formed in the base of said second instrument panel;
 wherein the second air bag door portion is closer to a passenger than the first air bag door portion;
 wherein one end of the base of said first air bag door portion and one end of the base of said second air bag door portion are fixed to the base of said first instrument panel and the base of said second instrument panel respectively, and the other end of the base of said first air bag door portion and the other end of the base of said second air bag door portion are free and disposed along the parting line that separates said first instrument panel from said second instrument panel; and
 wherein at least the free end of the base of said second air bag door portion is wider than an air bag case located adjacent the first and second air bag door portions.

10. An instrument panel integrally equipped with an air bag door portion, wherein the instrument panel is divided into a front instrument panel with a base and a rear instrument panel with a base and a vehicle lateral outside end portion, comprising:
 a front air bag door portion having a base and closing an opening for deployment of an air bag body, which opening is formed in the base of said front instrument panel; and
 a rear air bag door portion having a base and a hinge line, that closes an opening for deployment of the air bag body, which opening is formed in the base of said rear instrument panel;
 wherein the rear air bag door portion is closer to a passenger than the front air bag door portion;
 wherein one end of the base of said front air bag door portion and one end of the base of said rear air bag door portion are fixed to the base of said front instrument panel and the base of said rear instrument panel respectively, and the other end of the base of said front air bag door portion and the other end of the base of said rear air bag door portion are free and disposed along a parting line that separates said front instrument panel from said rear instrument panel; and
 wherein at least the free end of the base of said rear air bag door portion is wider than an air bag case located adjacent the front and rear air bag door portions, and the rear air bag door portion is set to a dimension to reach a point where an extended line of the hinge line of the rear air bag door portion intersects with said parting line and to reach the vehicle lateral outside end portion of the rear instrument panel.

11. The instrument panel according to claim 10, wherein said front instrument panel has a skin provided with a fragile portion at a location substantially opposed to vehicle lateral opposed ends of the base of said front air bag door portion, said fragile portion serving as a starting point of cleavage when the front air bag door portion is deployed.

12. The instrument panel according to claim 10, wherein said front instrument panel has a skin with an end portion of a side tear line at a location substantially opposed to the vehicle lateral opposed ends of the base of said front air bag door portion, said side tear line extending in a direction in which the front air bag door portion is cloven during deployment thereof.

13. The instrument panel according to claim 12, wherein said front instrument panel has skin holding means for holding the skin that is outside said front air bag door portion and adjacent to said side tear line onto the base of said front instrument panel.

14. The instrument panel according to claim 13, wherein said front instrument panel has door-side skin holding means for holding said skin of said front instrument panel, opposed to the front air bag door portion adjacent to said side tear line onto the base of said front air bag door portion.

15. The instrument panel according to claim 12, wherein said side tear line is invisible.

16. The instrument panel according to claim 12, further comprising a garnish extending in a vehicle lateral direction to cover a front end portion of said front air bag door portion and a front end portion of the side tear line from an inside of a passenger compartment.

17. The instrument panel according to claim 10, wherein the base of the front air bag door portion has a hinge portion, and further comprising:
 a fastening member for fastening the hinge portion of the base of said front air bag door portion to said air bag case; and
 a protection plate for covering said fastening member from a location below and adjacent to said fastening member.

18. The instrument panel according to claim 12, wherein a fragile portion is formed at the end portion of said skin and on said side tear line, said fragile portion serving as a starting point of cleavage when the front air bag door portion is deployed.

* * * * *